(12) United States Patent
Cheng

(10) Patent No.: US 10,379,681 B2
(45) Date of Patent: Aug. 13, 2019

(54) TOUCH SENSOR HAVING WAVEGUIDES AND DISPLAY DEVICE INCLUDING THE TOUCH SENSOR

(71) Applicant: Japan Display Inc., Tokyo (JP)

(72) Inventor: Hsiang-Yuan Cheng, Tokyo (JP)

(73) Assignee: Japan Display Inc., Tokyo (JP)

( * ) Notice: Subject to any disclaimer, the term of this patent is extended or adjusted under 35 U.S.C. 154(b) by 112 days.

(21) Appl. No.: 15/642,765

(22) Filed: Jul. 6, 2017

(65) Prior Publication Data
US 2018/0024698 A1    Jan. 25, 2018

(30) Foreign Application Priority Data
Jul. 20, 2016    (JP) ................................. 2016-142192

(51) Int. Cl.
*G06F 3/042*    (2006.01)

(52) U.S. Cl.
CPC .. *G06F 3/0428* (2013.01); *G06F 2203/04103* (2013.01)

(58) Field of Classification Search
CPC ................. G06F 3/0421; G06F 3/0428; G06F 2203/04103
See application file for complete search history.

(56) References Cited

U.S. PATENT DOCUMENTS

| 9,660,003 | B2 | 5/2017 | Sato et al. | |
|---|---|---|---|---|
| 2004/0120684 | A1* | 6/2004 | Ishibashi | C09K 11/7734 385/141 |
| 2010/0097348 | A1* | 4/2010 | Park | G06F 3/0421 345/175 |
| 2010/0156848 | A1* | 6/2010 | Yatsuda | B29D 11/00663 345/175 |
| 2011/0279411 | A1* | 11/2011 | Shimizu | G02B 6/1221 345/175 |
| 2015/0103264 | A1* | 4/2015 | Lee | G06F 3/041 349/12 |

FOREIGN PATENT DOCUMENTS

| JP | 2015-018331 A | 1/2015 |
|---|---|---|
| JP | 2015-050245 A | 3/2015 |

* cited by examiner

*Primary Examiner* — Laurence J Lee
(74) *Attorney, Agent, or Firm* — Michael Best & Friedrich LLP

(57) ABSTRACT

Disclosed is a touch sensor including a plurality of first optical waveguides arranged in a stripe form, a plurality of second optical waveguides located over the plurality of first optical waveguides, arranged in a stripe form, and intersecting the plurality of first optical waveguides, and an intermediate layer between the plurality of first optical waveguides and the plurality of second optical waveguides. Each of the plurality of first optical waveguides and the plurality of second optical waveguides includes a core including an elastomer as well as a clad in contact with the core other than side surfaces of the core perpendicular to a longitudinal direction of the core. The intermediate layer has a modulus of elasticity higher than that of the elastomer.

17 Claims, 24 Drawing Sheets

232

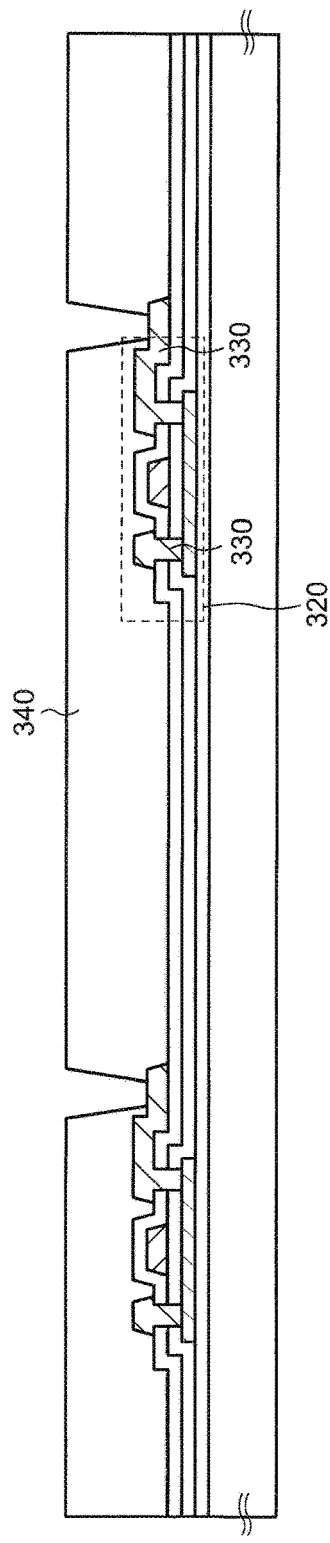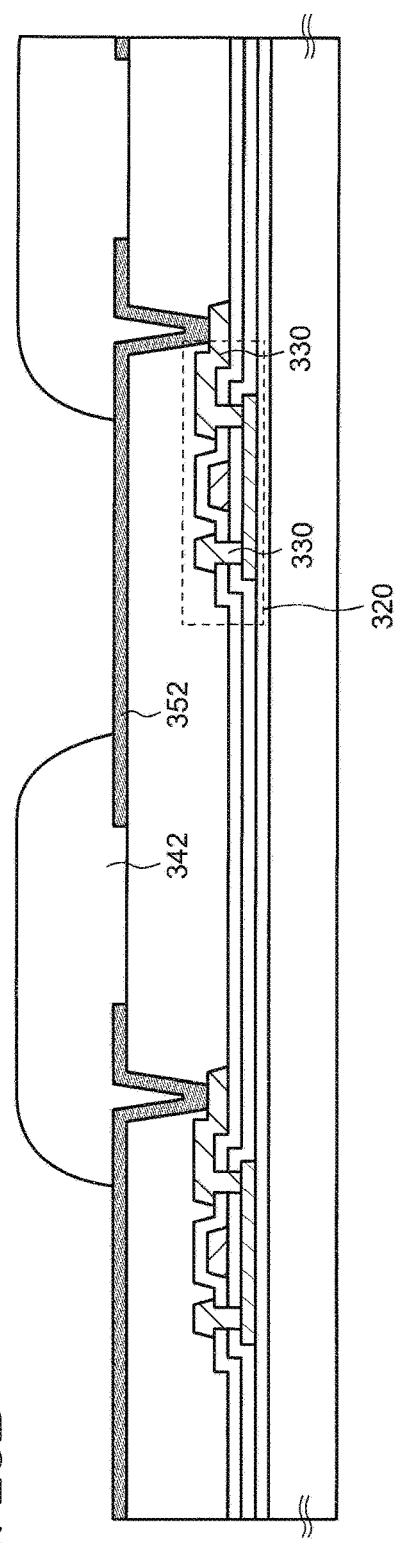

TOUCH SENSOR HAVING WAVEGUIDES AND DISPLAY DEVICE INCLUDING THE TOUCH SENSOR

CROSS REFERENCE TO RELATED APPLICATIONS

This application is based on and claims the benefit of priority from the prior Japanese Patent Application No. 2016-142192, filed on Jul. 20, 2016, the entire contents of which are incorporated herein by reference.

FIELD

An embodiment of the present invention relates to a touch sensor and a manufacturing method thereof. Alternatively, an embodiment of the present invention relates to a display device to which the touch sensor is installed and a manufacturing method thereof.

BACKGROUND

A touch sensor has been known as an interface for a user to input information to a display device. Installing a touch sensor to a display device allows a user to directly operate an input button or an icon displayed on a screen, facilitating input of information to a display device. For example, Japanese Patent Application Publications No. 2015-18331 and No. 2015-50245 disclose an electronic device having a display device including an organic EL (Electroluminescence) element on which a touch sensor is mounted.

SUMMARY

An embodiment of the present invention is a touch sensor. The touch sensor has a plurality of first optical waveguides arranged in a stripe form, and a plurality of second optical waveguides arranged in a stripe form over the plurality of first optical waveguides and intersecting the plurality of first optical waveguides. Each of the plurality of first optical waveguides and the plurality of second optical waveguides has a core including an elastomer and a clad in contact with the core other than side surfaces of the core perpendicular to a longitudinal direction of the core.

An embodiment of the present invention is a display device. The display device has a touch sensor and a display panel over the touch sensor. The display panel has a display region and a non-display region. The touch sensor includes a plurality of first optical waveguides arranged in a stripe form, and a plurality of second optical waveguides arranged in a stripe form over the plurality of first optical waveguides and intersecting the plurality of first optical waveguides. Each of the plurality of first optical waveguides and the plurality of second optical waveguides has a core including an elastomer; a clad in contact with the core other than side surfaces of the core perpendicular to a longitudinal direction of the core at least in the display region; and a reflection surface at an interface between the core and the clad. The display panel has a substrate and a display element between the substrate and the touch sensor.

BRIEF DESCRIPTION OF DRAWINGS

FIG. 23A and FIG. 23B are schematic cross-sectional views for explaining a manufacturing method of a display panel of a display device according to an embodiment of the present invention.

DESCRIPTION OF EMBODIMENTS

Hereinafter, the embodiments of the present invention are explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the present invention, when a plurality of films is formed by processing one film, the plurality of films may have functions or rules different from each other. However, the plurality of films originates from a film formed as the same layer in the same process and has the same layer structure and the same material. Therefore, the plurality of films is defined as films existing in the same layer.

In the specification and the scope of the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

First Embodiment

Figure 1:
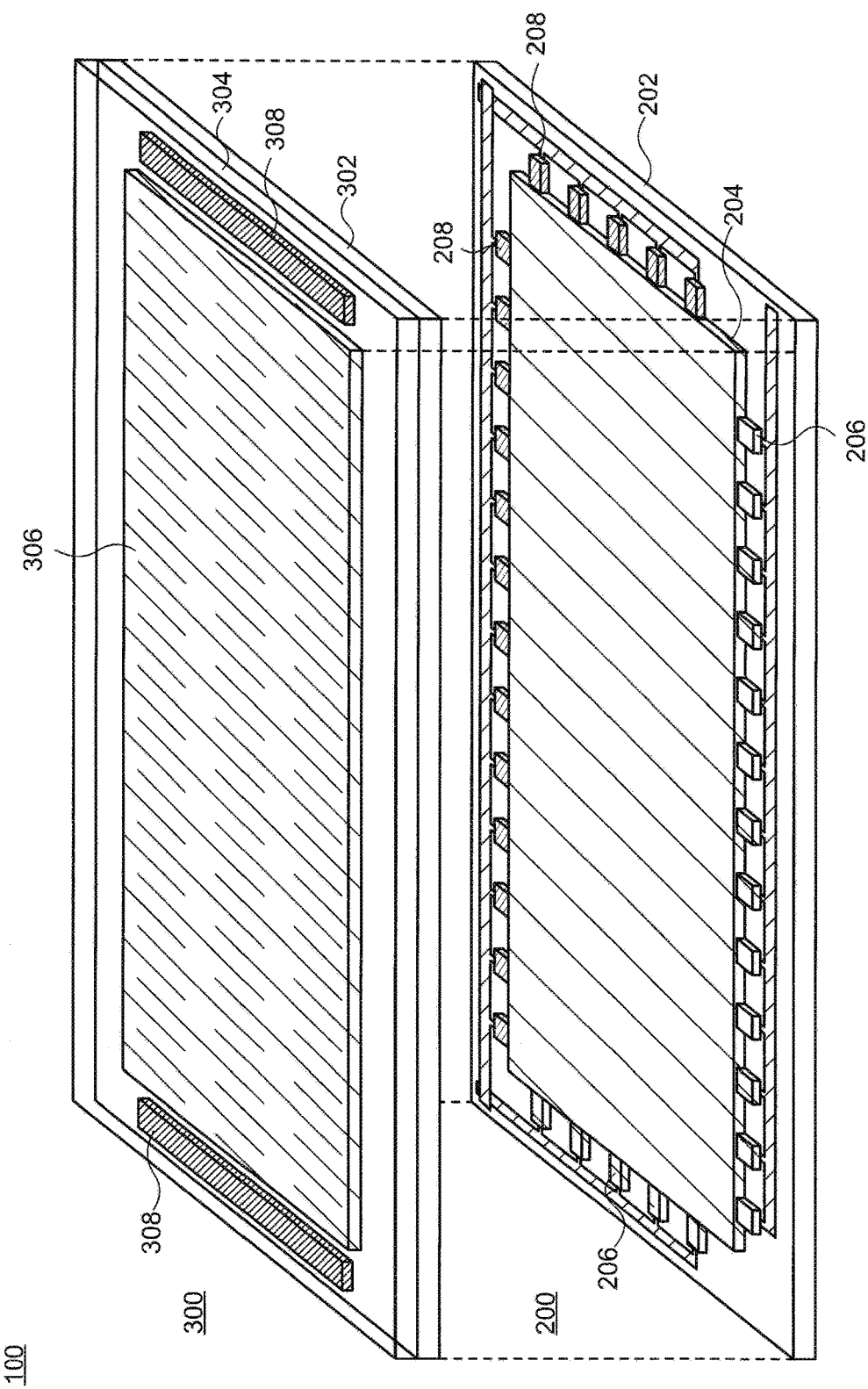
FIG. 1 is a schematic perspective view of a display device according to an embodiment of the present invention.

In this embodiment, a structure of a display device 100 according to an embodiment of the present invention is explained by using FIG. 1 to FIG. 4B.
1. Outline Structure The display device 100 has a touch sensor 200 and a display panel 300 arranged over the touch sensor 200. FIG. 1 shows a state where the touch sensor 200 and the display panel 300 are separated from each other. However, the touch sensor 200 and the display panel 300 are bonded to each other with an adhesive layer or the like. The display panel 300 reproduces an image, while the touch sensor 200 has a function to specify a position of a touch and estimate physical force provided to the display device 100 when touched by a user.

The touch sensor 200 possesses a detection region 204 provided over a substrate 202 and a plurality of light-emitting elements 206 and a plurality of light-detecting elements 208 over a periphery of the detection region 204. One light-emitting element 206 forms a pair with one light-detecting element 208, and the pair of the light-emitting element 206 and the light-detecting element 208 is arranged at a circumference of the detection region 204. With respect to several pairs, the light-emitting elements 206 and the light-detecting elements 208 are disposed at two opposing sides of the detection region 204, respectively. With respect to other pairs, the light-emitting elements 206 and the light-detecting elements 208 are disposed at other sides perpendicular to the aforementioned two sides. Note that, in the example shown in FIG. 1, a line connecting the pair of the light-emitting element 206 and the light-detecting element 208 arranged at two opposing sides is perpendicular to a line connecting the pair of the light-emitting element 206 and the light-detecting element 208 disposed at the other two sides. However, these lines may not be perpendicular to each other as long as they intersect each other. Although not shown in FIG. 1, driver circuits for controlling the light-emitting elements 206 and the light-detecting elements 208 and wirings connecting the driver circuits may be provided over the substrate 202. Alternatively, the driver circuits may be formed over a substrate different from the substrate 202.

The display panel 300 has an array substrate 302 and an opposing substrate 304 over the array substrate 302, and a display region 306 is formed therebetween. As described below in detail, a plurality of pixels including semiconductor elements such as a display element and transistors controlling the display element are arranged in the display region 306. An image is reproduced on the display region 306 by the plurality of pixels. Driver circuits 308 for controlling the pixels may be disposed between the array substrate 302 and the opposing substrate 304. Alternatively, the driver circuits 308 may not be provided between the array substrate 302 and the opposing substrate 304 but may be disposed over a connector (not shown) for connection to an external circuit.

The touch sensor 200 and the display panel 300 overlap with each other, by which the detection region 204 and the display region 306 are arranged so as to overlap with each other. Thus, when a user touches the opposing substrate 304 or applies force to the opposing substrate 304 while recognizing an image reproduced on the display region 306, the force is transmitted to the detection region 204, allowing specification of a touch position of the user and estimation of the force applied by the user.

2. Touch Sensor

Figure 2:
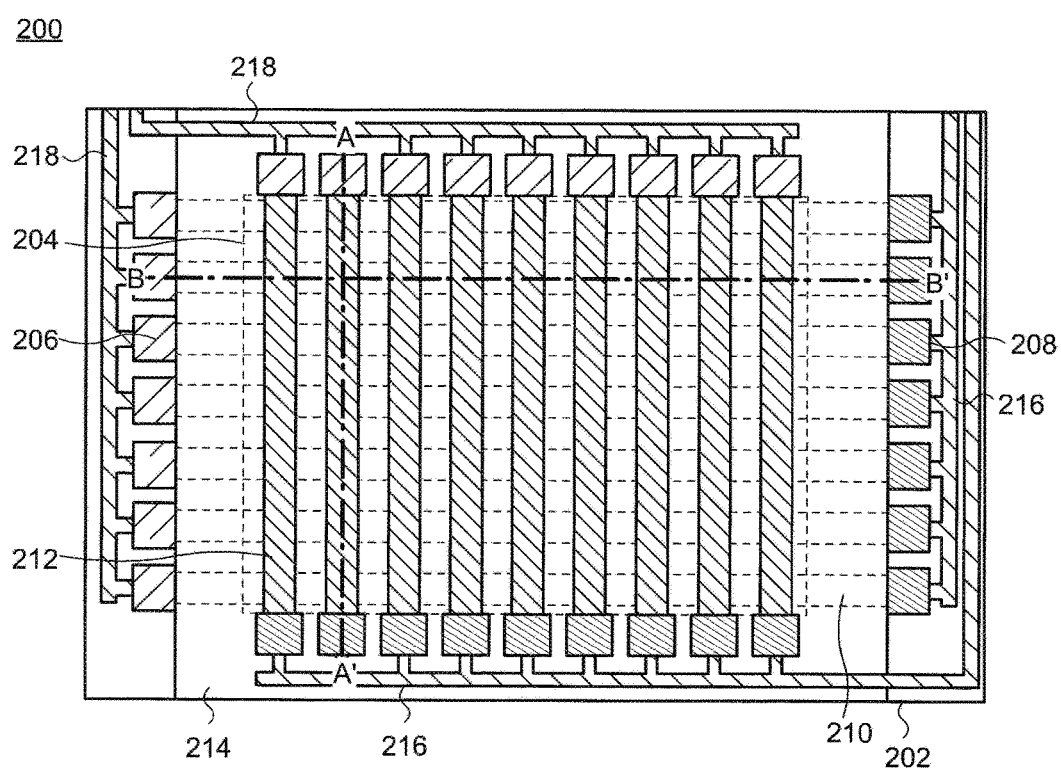
FIG. 2 is a schematic top view of a touch sensor according to an embodiment of the present invention.
Figure 3A:
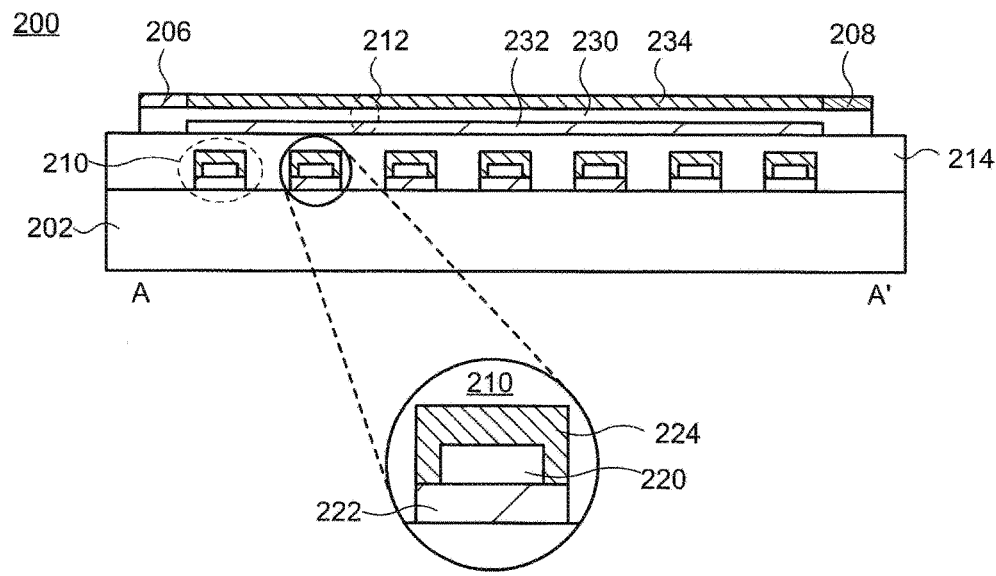
FIG. 3A and FIG. 3B are schematic cross-sectional views of a touch sensor according to an embodiment of the present invention.
Figure 3B:
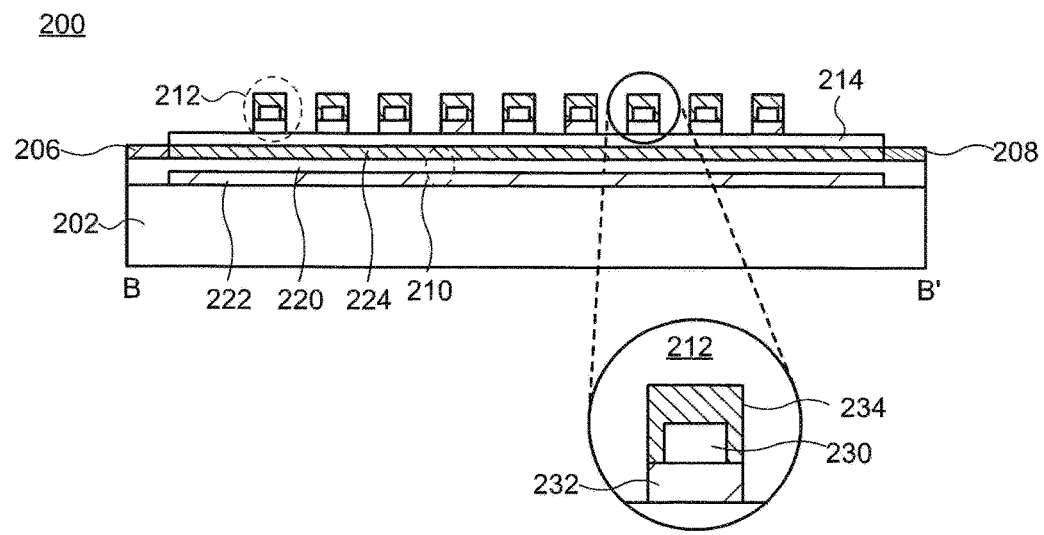

A schematic top view of the touch sensor 200 is shown in FIG. 2, and schematic cross-sectional views thereof are shown in FIG. 3A and FIG. 3B. FIG. 3A and FIG. 3B respectively correspond to cross sections along chain lines A-A' and B-B'.

As shown in FIG. 2 to FIG. 3B, the touch sensor 200 has a plurality of first optical waveguides 210 and a plurality of second optical waveguides arranged in a stripe form over the substrate 202. The plurality of first optical waveguides 210 extends in the same direction as each other. The plurality of first optical waveguides 210 extends in a direction parallel to a long side of the substrate 202 in FIG. 2. The plurality of second optical waveguides 212 is disposed over the first optical waveguides 210 and extends in a direction intersecting the direction in which the first optical waveguides 210 extend. Thus, each of the plurality of second optical waveguides 212 intersects the plurality of first optical waveguides 210. An intermediate layer 214 is provided between the plurality of first optical waveguides 210 and the plurality of second optical waveguides 212. A region including regions where the plurality of first optical waveguides 210 intersects the plurality of second optical waveguides 212 (a region surrounded by a dotted line in FIG. 2) corresponds to the detection region 204.

The pair of the light-emitting element 206 and the light-detecting element 208 is provided at terminals of each of the plurality of first optical waveguides 210 and the plurality of second optical waveguides 212. The light-emitting elements 206 are connected to an external circuit (not illustrated) with wirings 218 and controlled by the external circuit. Light emitted from the light-emitting element 206 is transmitted in the respective first optical waveguide 210 or the second optical waveguide 212 and detected by the light-detecting element 208. A signal generated by the light-detecting element 208 upon light detection is transmitted to an external circuit via wirings 216 and processed by the external circuit. As described above, the plurality of second optical waveguides 212 is arranged over the plurality of first optical waveguides 210 with the intermediate layer 214 sandwiched therebetween. Therefore, the light-emitting elements 206 and the light-detecting elements 208 provided to the second optical waveguides 212 can be disposed over the intermediate layer 214 (see FIG. 3A).

In FIG. 1 to FIG. 3B, an example including seven first optical waveguides 210 and nine second optical waveguides 212 is demonstrated. However, the numbers of the first optical waveguides 210 and the second optical waveguides 212 are not limited and can be freely determined in view of the size and shape of the detection region 204, accuracy in specifying a touch position of a user, and the like.

As shown in an enlarged figure of FIG. 3A, the plurality of first optical waveguides 210 has a core 220 and clads 222 and 224. The core 220 is in contact with a top surface of the clad 222. A side surface of the core 220 perpendicular to a longitudinal direction thereof is an edge surface, and the clad 224 is in contact with and covers a top surface and a side surface of the core 220 other than the edge surface. Therefore, the core 220 is surrounded by the clads 222 and 224.

Similarly, as shown in an enlarged figure of FIG. 3B, the plurality of second optical waveguides 212 has a core 230 and clads 232 and 234. The core 230 is in contact with a top surface of the clad 232. A side surface of the core 230 perpendicular to a longitudinal direction thereof is an edge surface, and the clad 234 is in contact with and covers a top surface and a side surface of the core 230 other than the edge surface. Therefore, the core 230 is surrounded by the clads 232 and 234.

At both terminal portions of the first optical waveguide 210, the core 220 protrudes from a region in which the clads 222 and 224 overlap with each other, and the light-emitting element 206 and the light-detecting element 208 are provided over the protruding portions. Similarly, at both terminal portions of the second optical waveguide 212, the core 230 protrudes from a region in which the clads 232 and 234 overlap with each other, and the light-emitting element 206 and the light-detecting element 208 are provided over the protruding portions. In this case, two clads in each of the optical waveguides may have the same length. The light emitted from the light-emitting element 206 is introduced into the cores 220 and 230 through the edge surfaces thereof. The light is repeatedly reflected at interfaces between the core 220 and the clads 222 and 234 or interfaces between the core 230 and the clads 232 and 234, passes through the cores 220 and 230, and then enters the light-detecting element 208.

It is preferred that the cores 220 and 230 be an elastomer having small absorption with respect to the light emitted from the light-emitting elements 206 and showing a rubber elasticity at room temperature. A polymer material is represented as such a material, for example, and a polysiloxane, a polyacrylates, a polymethacrylates, polyacrylonitrile, an epoxy resin, a polyester, a polyimide, a poly(ether ketone), polystyrene, a polycarbonate, polybutadiene, polyisoprene, and a copolymer including these polymers as a basic skeleton are exemplified as a polymer material. These polymer materials may be crosslinked. When the light-emitting elements 206 emit infrared light, a polymer material in which fluorine or deuterium is introduced to their side chains may be used in order to suppress absorption of infrared light.

It is possible to use a material whose refractive index is lower than that of the core 220 or a non-transparent material which can form a reflection surface at the interface with the core 220 for the clads 222 and 224. For example, a polymer material with a low refractive index may be used to form the clads 222, 224, 232, and 234. Alternatively, a metal may be employed for the clads 222, 224, 232, and 234. As a metal, copper, aluminum, tungsten, molybdenum, chromium, tantalum, titanium, or an alloy including one or more of these metals are exemplified. As described below, a thickness of the clads may be selected so as not to prevent deformation of the cores in view of the materials and thicknesses of the clads and cores. When a metal is used for the clads 222, 224, 232, and 234, the intermediate layer 214 also has a role to insulate the first optical waveguides 210 and the second optical waveguides 212. Hence, the intermediate layer 214 may not be provided when an insulator such as a polymer material is used for the clads 222, 224, 232, and 234.

A material of the intermediate layer 214 may be selected from a material having an insulating property, and the aforementioned polymer materials and an inorganic material are represented as such a material. A silicon-containing inorganic compound such as silicon oxide, silicon nitride, silicon oxynitride, and silicon nitride oxide is exemplified as an inorganic material. Note that a material of the intermediate layer 214 may be an elastomer. In this case, stress causing deformation of the core 230 can be transmitted to the core 230 when force is applied thereto by pressing with a finger as described below. The intermediate layer 214 is preferably rigid compared with a material included in the cores 220 and 230. In other words, a material in the intermediate layer 214 is preferred to have a larger elasticity than a material of the cores 220 and 230. Alternatively, it is preferred that a material in the intermediate layer 214 have a large Young's modulus, a small Poisson's ratio, or a large volume modulus compared with a material of the cores 220 and 230.

A light-emitting diode may be used as the light-emitting element 206. A light-emitting diode may be configured to output a laser. In this case, the light-emitting diode may be an edge-emitting laser or a surface-emitting laser. A surface-emitting laser may be a vertical-cavity surface-emitting laser. There is no limitation to a wavelength of light output from the light-emitting element 206, and the emitted light may include visible light, ultraviolet light, infrared light, or near-infrared light. The light-detecting element 208 is also an optoelectronic element, and a PIN diode including a silicon semiconductor, a compound semiconductor, or an oxide semiconductor may be used.

Figure 4A:
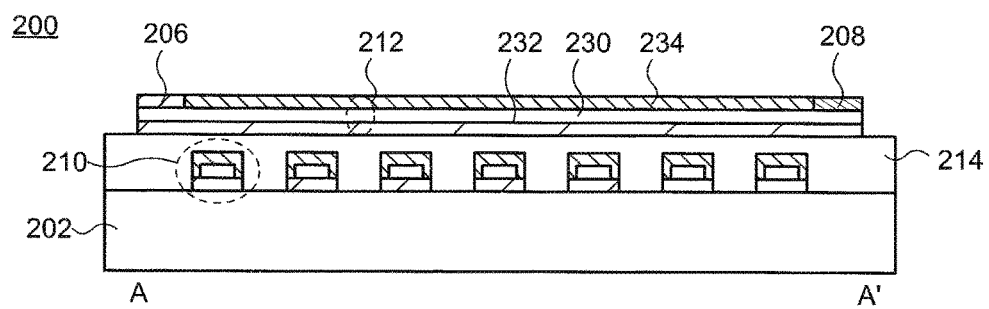
FIG. 4A and FIG. 4B are schematic cross-sectional views of a touch sensor according to an embodiment of the present invention.
Figure 4B:
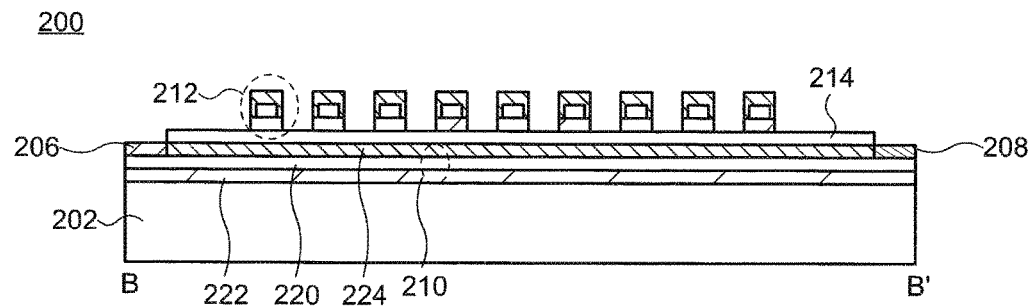

In the structure shown in FIG. 3A and FIG. 3B, two clads have the same or substantially the same length in each of the optical waveguides. However, the lower clad may be longer than the upper clad. For example, as shown in FIG. 4A and FIG. 4B, the lower clad 222 of the first optical waveguide 210 may be longer than the upper clad 224. In this case, the light-emitting element 206 and the light-detecting element 208 are able to overlap with the clad 222. Similarly, the lower clad 232 of the second optical waveguide 212 may be longer than the upper clad 234, and the light-emitting element 206 and the light-detecting element 208 may overlap with the clad 232.

Figure 5A:
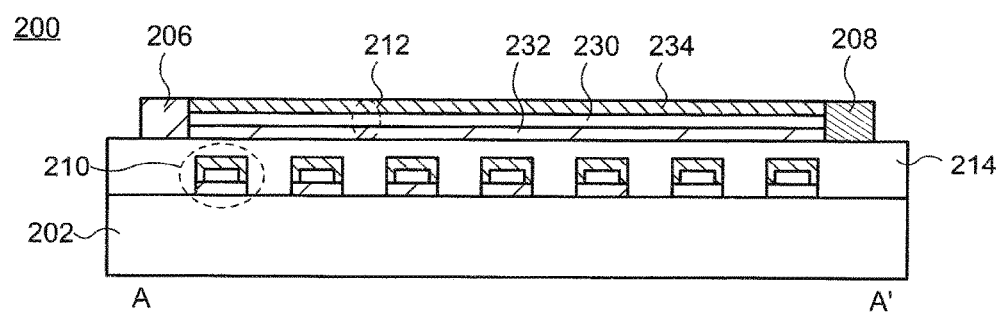
FIG. 5A and FIG. 5B are schematic cross-sectional views of a touch sensor according to an embodiment of the present invention.
Figure 5B:
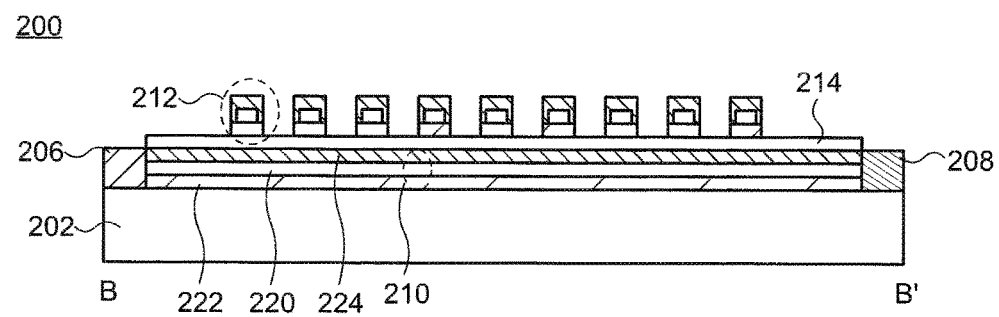

Alternatively, as shown in FIG. 5A and FIG. 5B, the light-emitting element 206 may be in contact with edge surfaces of the clads 222 and 232. Similarly, the light-detecting element 208 may also be in contact with the edge surfaces of the clads 222 and 232. In this case, the light-emitting element 206 and the light-detecting element 208 sandwiching the first optical waveguide 210 may be in direct contact with the substrate 202 or a base film which is not illustrated. On the other hand, the light-emitting element 206 and the light-detecting element 208 sandwiching the second optical waveguide 212 may be in contact with the intermediate layer 214.

Figure 6A:
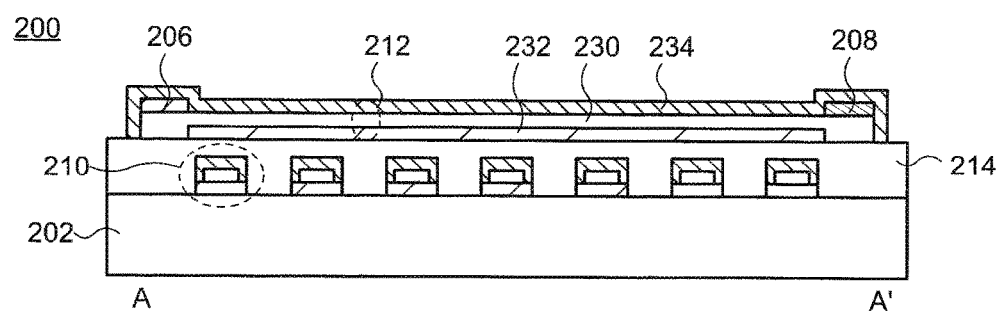
FIG. 6A and FIG. 6B are schematic cross-sectional views of a touch sensor according to an embodiment of the present invention.
Figure 6B:
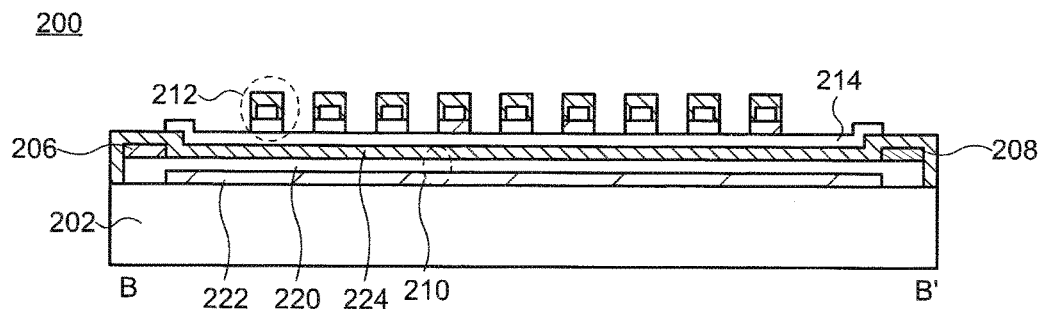
Figure 7A:
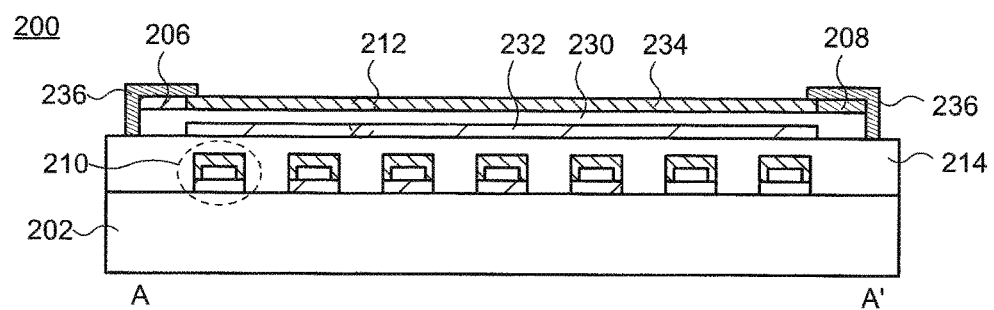
FIG. 7A and FIG. 7B are schematic cross-sectional views of a touch sensor according to an embodiment of the present invention.
Figure 7B:
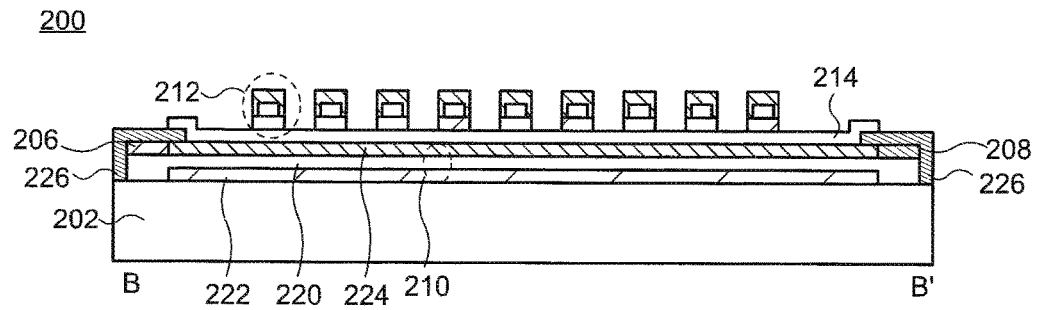

Alternatively, as shown in FIG. 6A and FIG. 6B, the upper clads 224 and 234 in the optical waveguides may be provided so as to cover the light-emitting element 206 and the light-detecting element 208. For example, the clad 224 located over the core 220 of the first optical waveguide 210 may cover top surfaces of the light-emitting element 206 and the light-detecting element 208 and side surfaces of the core 220 opposite to the first optical waveguide 210. Similarly, the clad 234 located over the core 230 of the second optical waveguide 212 may cover top surfaces of the light-emitting element 206 and the light-detecting element 208 and side surfaces of the core 230 opposite to the second optical waveguide 212. In this case, as shown in FIG. 7A and FIG. 7B, a part of the clad 224 and a part of the clad 234 (covers 226 and 236), which cover the top surfaces and side surfaces of the light-emitting element 206 and the light-detecting element 208, may be structured with a material different from that of the other parts. For example, a metal different from a metal of the clads 224 and 234, a resin without a light-transmitting property, or a light-transmitting resin to which a pigment of black or a similar color is mixed may be used for the covers 226 and 236. When the light-emitting element 206 and the light-detecting element 208 are covered by the upper clads 224 and 234 as shown in FIG. 6A and FIG. 6B, it is necessary to apply a process which does not damage the light-emitting element 206 and the light-detecting element 208 when the clads 224 and 234 are formed. In contrast, the covers 226 and 236 are additionally provided in the structure of FIG. 7A and FIG. 7B, which expands a selection range of materials and processes of the clads 224 and 234, the light-emitting element 206, and the light-detecting element 208. The covers 226 and 236 may include a material which is capable of reflecting light provided by the light-emitting element 206, by which the light from the light-emitting element 206 can be effectively supplied to the optical waveguides.

Figure 8A:
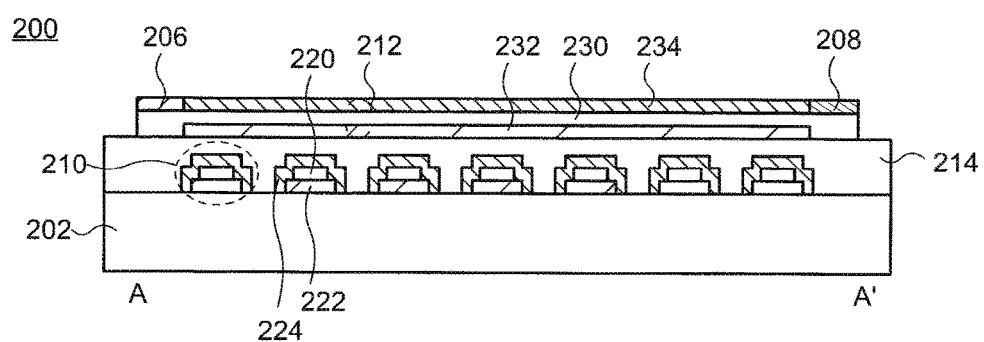
FIG. 8A and FIG. 8B are schematic cross-sectional views of a touch sensor according to an embodiment of the present invention.
Figure 8B:
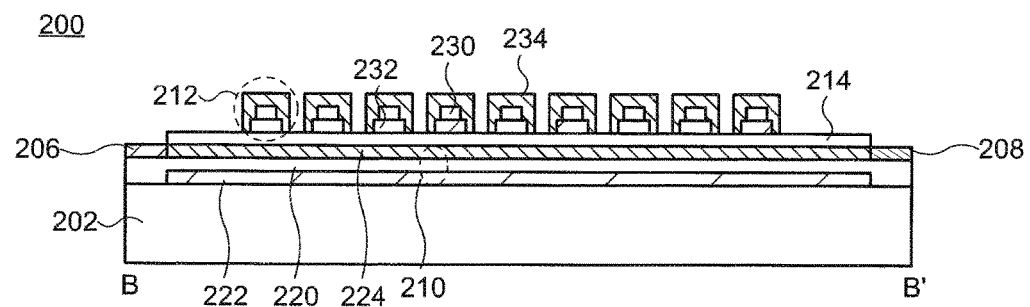

Each optical waveguide may be configured so that the upper clad covers a side surface of the lower clad. Specifically, as shown in FIG. 8A and FIG. 8B, the clad 224 located over the core 220 of the first optical waveguide 210 may be formed so as to cover a side surface of the clad 222 located below the core 220. Similarly, the clad 234 located over the core 230 of the second optical waveguide 212 may be formed so as to cover a side surface of the clad 232 located under the core 230.

Figure 9A:
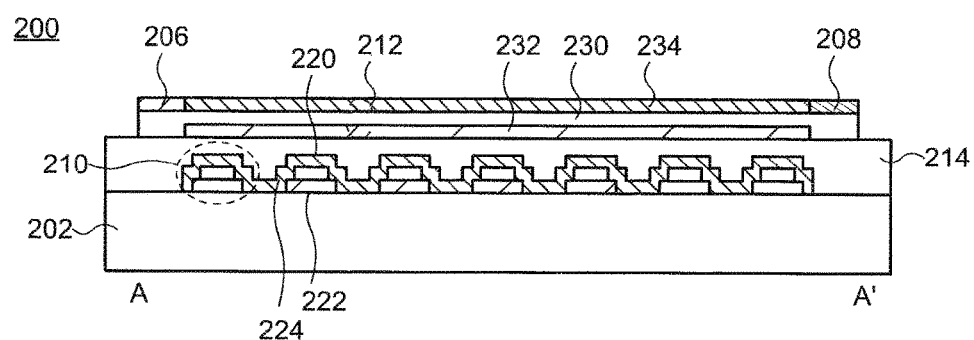
FIG. 9A and FIG. 9B are schematic cross-sectional views of a touch sensor according to an embodiment of the present invention.
Figure 9B:
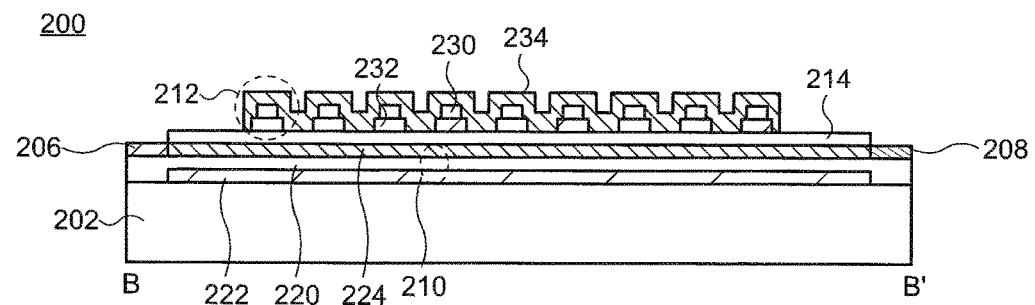
Figure 10:
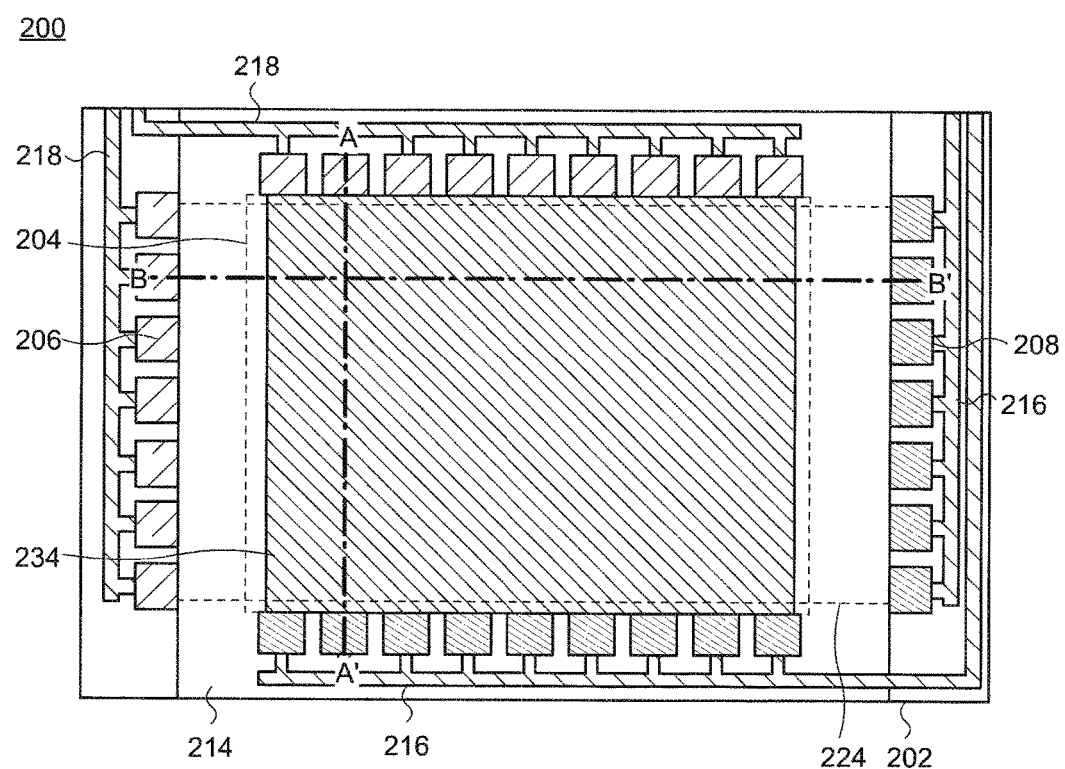
FIG. 10 is a schematic top view of a touch sensor according to an embodiment of the present invention.

In the structure shown in FIG. 8A and FIG. 8B, the upper clads are separated between the adjacent optical waveguides. However, the upper clads may be in contact with each other between the adjacent optical waveguides. For example, as shown in FIG. 9A, the clad 224 of the first optical waveguide 210 may be in contact with the clad 224 of the adjacent first optical waveguide 210. Therefore, one clad 224 is shared by the plurality of first optical waveguides 210. Similarly, as shown in FIG. 9B, the clad 234 of the second optical waveguide 212 may be in contact with the clad 234 of the adjacent second optical waveguide 234. Therefore, one clad 234 is shared by the plurality of second optical waveguides 212. A schematic top view of the touch sensor 200 having such a structure is shown in FIG. 10. As shown in FIG. 10, it is not necessary to pattern the clads 224 and 234 into independent optical waveguides, which enables the formation of the clads 224 and 234 by a simpler process.

Figure 11A:
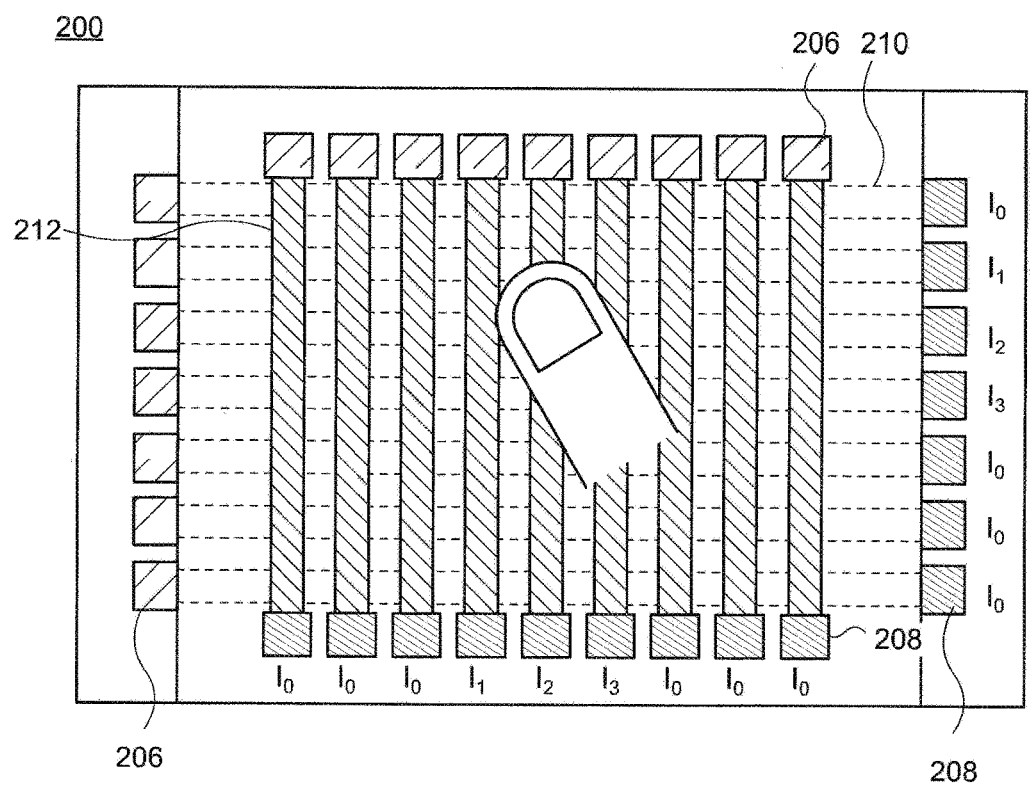
FIG. 11A to FIG. 11C are drawings for explaining an operation mechanism of a touch sensor according to an embodiment of the present invention.
Figure 11B:
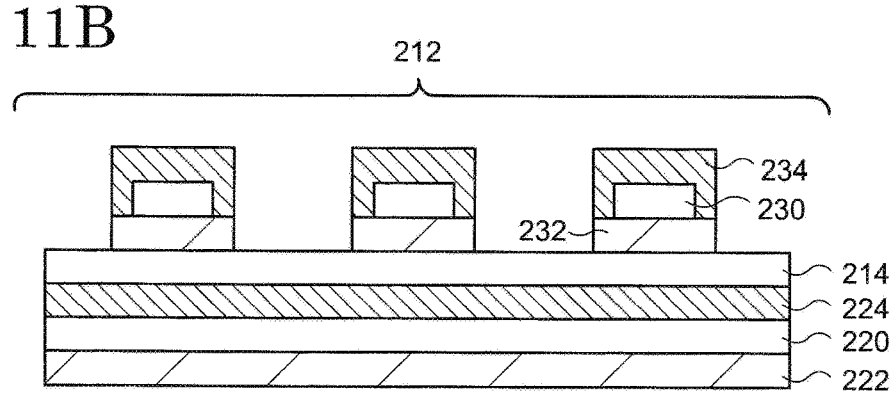
Figure 11C:
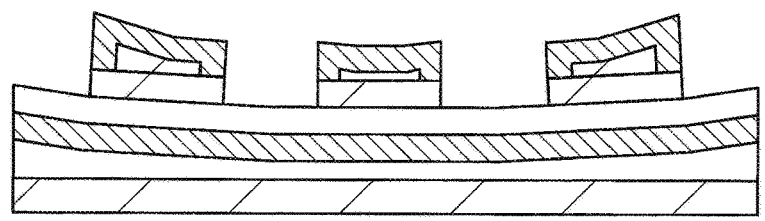

A method for specifying a touch position by the touch sensor 200 and a method for estimating force applied to the touch sensor 200 are explained by using FIG. 11A to FIG. 11C. As schematically shown in FIG. 11A, when a user applies physical force to the touch sensor 200 through the display panel 300, the cores 220 and 230 having rubber elasticity are deformed. As a result, the shape and/or the volume of the cores 220 and 230 are/is changed from a state before applying the force (FIG. 11B) to a state after applying the force (FIG. 11C). Hence, the light-detecting element 208 cannot receive a part of the light emitted from the light-emitting element 206, resulting in a decrease in intensity of light received by the light-detecting element 208.

In the example of FIG. 11A, the clads 224 and 234 and the cores 220 and 230 of the first optical waveguides 210 and the second optical waveguides 220 are deformed at a vicinity of the position where a finger of a user is placed so that the optical pass is blocked or narrowed. Thus, intensity of light received by the respective light-detecting elements 208 is decreased. Note that the clad 234 and the core 230 are deformed when the intermediate layer 214 is depressed or bent. For example, when the intensity of light received by the light-detecting element 208 is assumed to be $I_0$ before a touch of a user, the intensity of light received by the light-detecting elements 208 provided to the first optical waveguide 210 or second optical waveguide 212 in which the core 220 or 230 is deformed will be $I_1$, $I_2$, and $I_3$, respectively, which are lower than $I_0$. Detection of the change in intensity of the received light makes it possible to specify coordinates of the touch position and estimate the applied force.

As described above, the touch sensor 200 shown in the present embodiment specifies the touch position and a magnitude of the applied force on the basis of the change of the light received by the light-detecting elements 208. Therefore, the touch sensor 200 does not provide any electric influence on the display panel 300, thereby suppressing generation of noise and parasitic capacitance which is a problem of an electrostatic-capacitance type touch sensor and the like. As result, even if the touch sensor 200 is being operated, touch sensitivity with high accuracy can be maintained and a high-quality image can be reproduced by the display panel 300.

3. Display Panel

Figure 12:
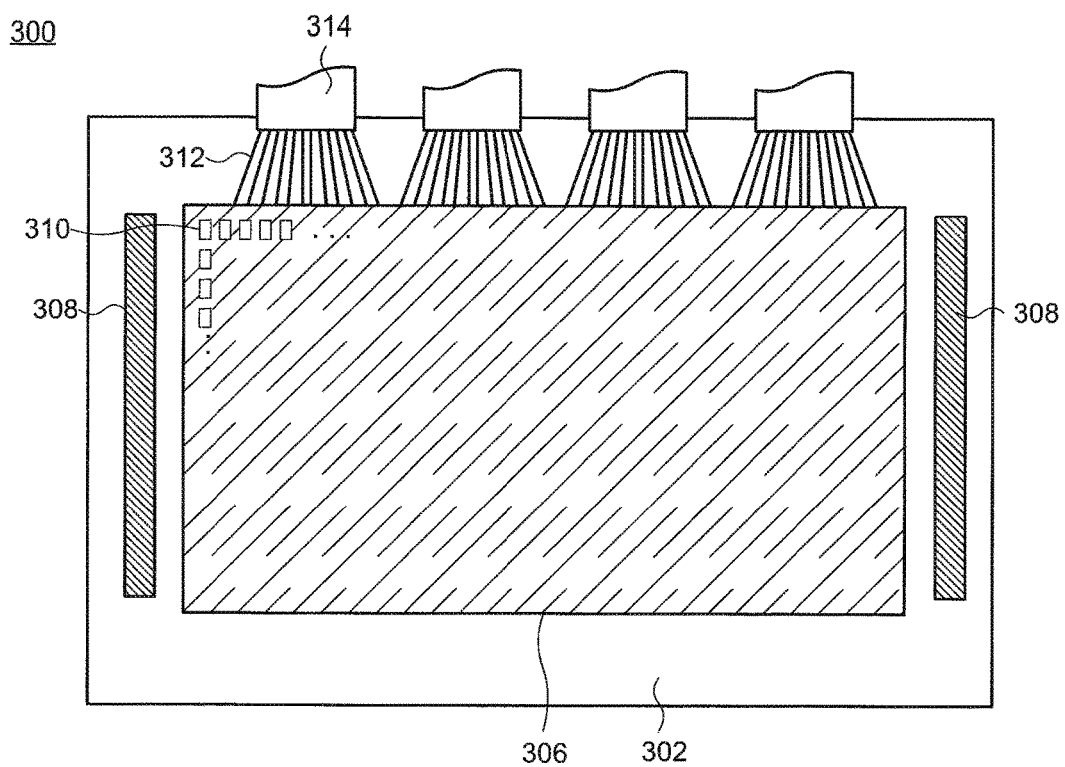
FIG. 12 is a schematic top view of a display panel according to an embodiment of the present invention.

A schematic top view of the display panel 300 is shown in FIG. 12. As described above, the display panel 300 possesses the display region 306 including the plurality of pixels 310 arranged in a row direction and a column direction and the driver circuits 308 over a top surface of the array substrate 302. The display region 206 and the driver circuits 308 are disposed between the array substrate 302 and the opposing substrate 304. The display region 306 is connected to the driver circuits 308, by which the pixels 310 are controlled by the driver circuits 308. Wirings 312 extend from the display region 306 to a side surface of the array substrate 302 and are exposed at an edge portion of the array substrate 302 to form terminals. The terminals are connected to the connector 314 such as a flexible printed circuit (FPC) substrate. Image signals supplied from an external circuit are provided to the pixels 310 through the driver circuits 308, the display elements in the pixels 310 are controlled in association with the signals from the driver circuits 308, and an image is reproduced on the display region 306. In FIG. 12, two driver circuits 308 are disposed so as to sandwich the display region 306. However, the number of the driver circuits 308 may be one. Additionally, the driver circuits 308 are not necessarily formed over the array substrate 302, and a driver circuit formed on another substrate may be mounted over the array substrate 302 or the connector 314. Alternatively, a driver circuit having a part of a function of the external circuit may be installed between the display region 306 and the connector 314.

Display elements giving colors different from one another, such as an organic EL element or a liquid crystal element, may be provided to the plurality of pixels 310, by which full-color display can be performed. For example, display elements giving red, green, and blue colors may be arranged in three pixels 310, respectively. Alternatively, display elements giving white color are used in all of the pixels 310, and full-color display may be conducted by extracting red, green, and blue colors from the respective pixels 310 by using a color filter. An arrangement of the pixels 310 is not also limited, and a stripe arrangement, a delta arrangement, and a PenTile arrangement may be employed.

Figure 13:
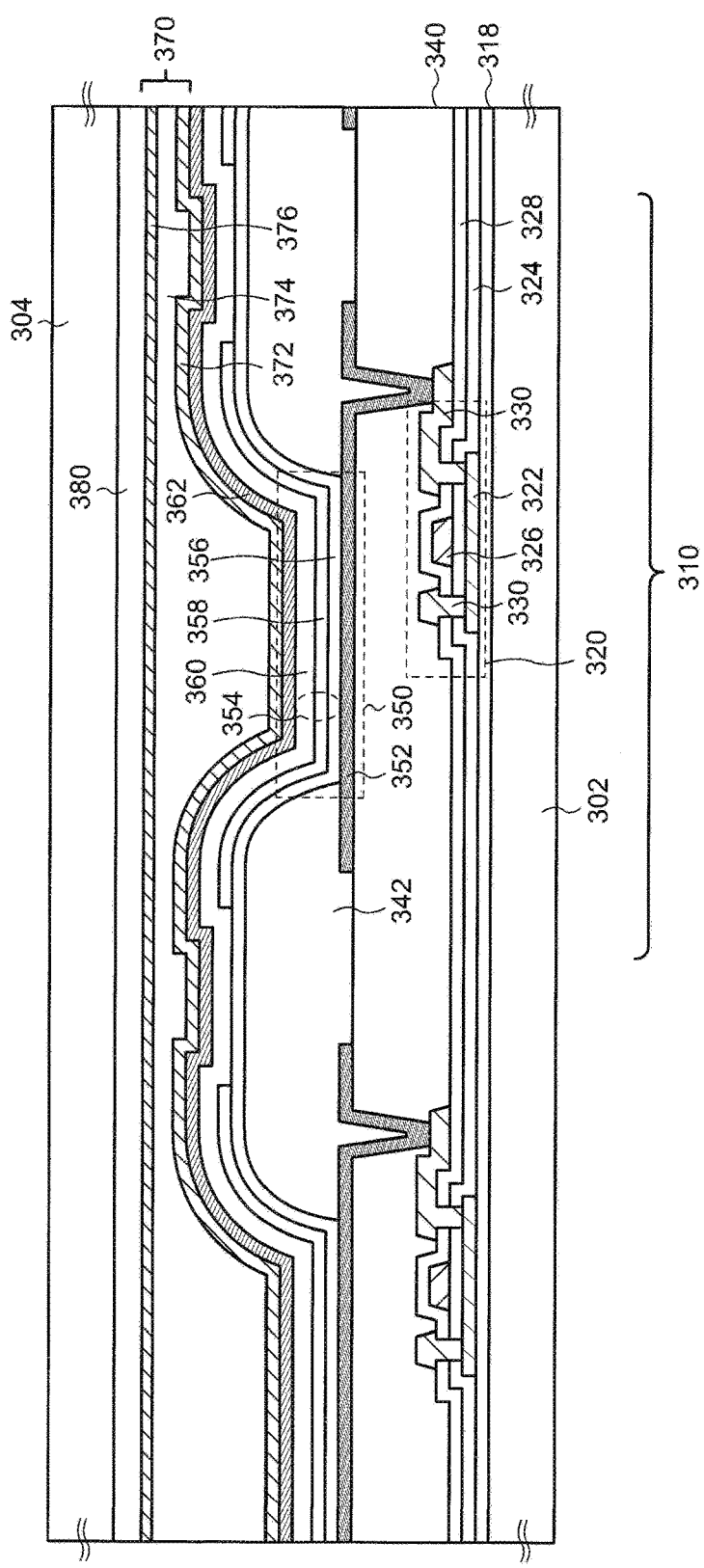
FIG. 13 is a schematic cross-sectional view of a display panel according to an embodiment of the present invention.

A schematic cross-sectional view of the display region 306 is shown in FIG. 13. FIG. 13 is a schematic view of a cross section of the plurality of pixels 310 each having an organic EL element. A transistor 320 and the organic EL element 350 connected thereto are provided in the pixel 310. FIG. 13 demonstrates an example in which one transistor 320 is arranged in one pixel 310. However, a plurality of transistors and another semiconductor element such as a capacitor element may be disposed in one pixel 310.

The transistor 320 may have a semiconductor film 322, a gate insulating film 324, the gate electrode 326, the source/drain electrodes 330, and the like over an undercoat 318 which is formed over the array substrate 302 and has a single-layer or multi-layer structure. An interlayer film 328 may be further provided over the gate electrode 326. The structure of the transistor 320 is not limited, and a top-gate type or bottom-gate type transistor may be used. The vertical relationship between the semiconductor film 322 and the source/drain electrodes 330 is arbitrarily selected, and a bottom-contact type transistor or a top-contact type transistor may be employed.

A leveling film 340 absorbing depressions, projections, and inclines caused by the transistor 320 and other semiconductor elements to give a flat surface is formed over the transistor 320. A first electrode 352 of the organic EL element 350 is electrically connected to one of the source/drain electrodes 330 through an opening portion formed in the leveling film 340.

The display panel 300 further possesses a partition wall 342 which covers an edge portion of the first electrode 352 and fills the opening portion used for the connection of the first electrode 352 to one of the source/drain electrodes 330. An EL layer 354 is formed over the first electrode 352 and the partition wall 342 over which a second electrode 362 is provided. Note that, in the present specification and claims, an EL layer means all of the layers sandwiched by the first electrode 352 and the second electrode 362. In FIG. 13, the EL layer 354 is illustrated so as to have three layers (first layer 356, second layer 358, and third layer 360). However, as described below, the number of the layers in the EL layer 354 is not limited. The organic EL element 350 is structured by the first electrode 352, the EL layer 354, and the second electrode 362.

A passivation film 370 is disposed over the organic EL element 350 to protect the organic EL element 350. The passivation film 370 has a function to prevent impurities such as water and oxygen from entering the organic EL element 350 from outside. As shown in FIG. 13, the passivation film 370 may have a plurality of stacked layers. Here, the passivation film 370 possesses a first layer 372, a second layer 374, and a third layer 376. As described below, the first layer 372 and the third layer 376 may include an inorganic compound, while the second layer 374 may include an organic compound. The opposing substrate 304 is disposed over the passivation film 370 with an adhesive layer 380 sandwiched therebetween.

As shown in FIG. 1, in the display device 100 according to the present embodiment, the touch sensor 200 is provided under the display panel 300. Therefore, it is preferred that the display elements such as the organic EL elements 350 formed in the pixels 310 of the display panel 300 be configured to give an image on an upper side of the display panel 300. In the case where the display element is an organic EL element, the first electrode 352 and the second electrode 362 are configured so that the light from the EL layer 354 is extracted from the second electrode 362.

Second Embodiment

Figure 19A:
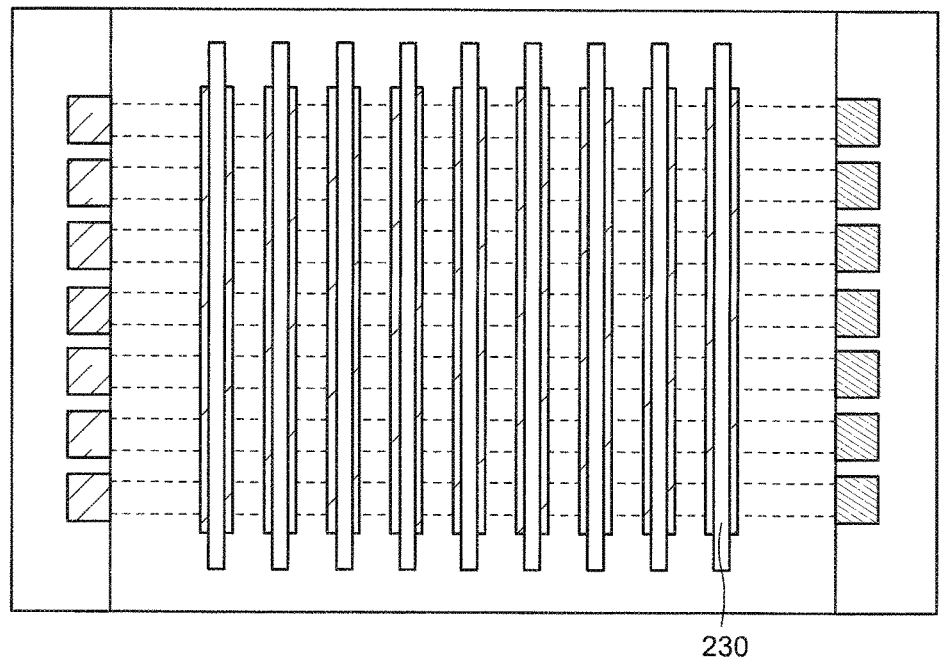
FIG. 19A is a schematic top view and FIG. 19B and FIG. 19C are schematic cross-sectional views for explaining a manufacturing method of a touch sensor according to an embodiment of the present invention.
Figure 19B:
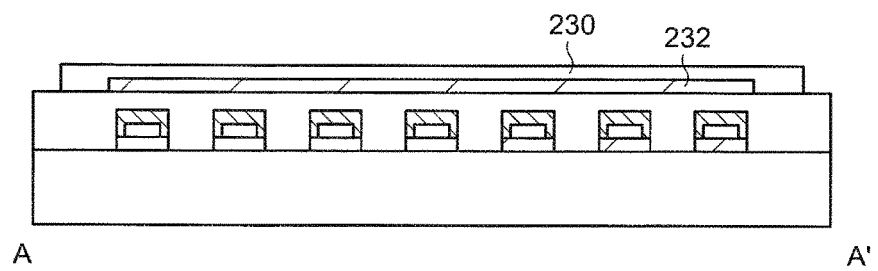
Figure 19C:
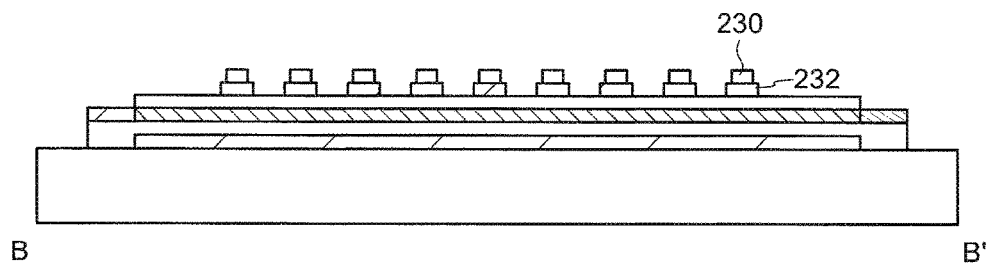
Figure 20A:
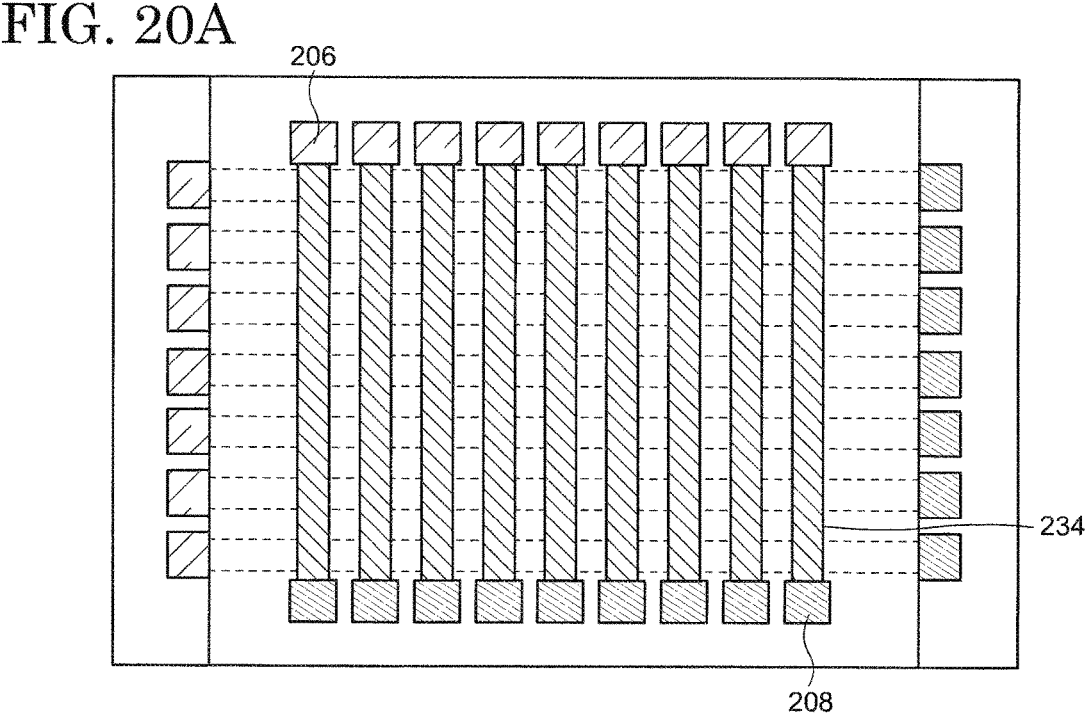
FIG. 20A is a schematic top view and FIG. 20B and FIG. 20C are schematic cross-sectional views for explaining a manufacturing method of a touch sensor according to an embodiment of the present invention.
Figure 20B:
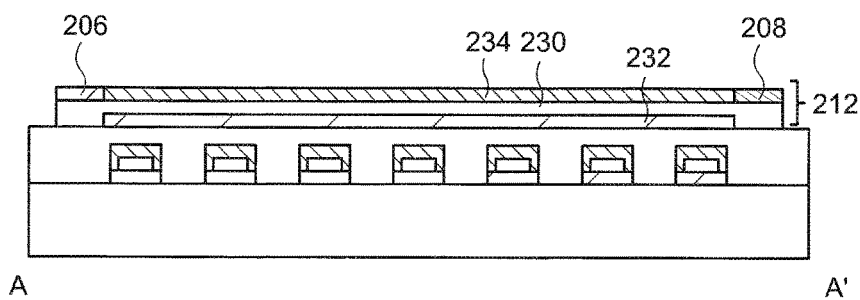
Figure 20C:
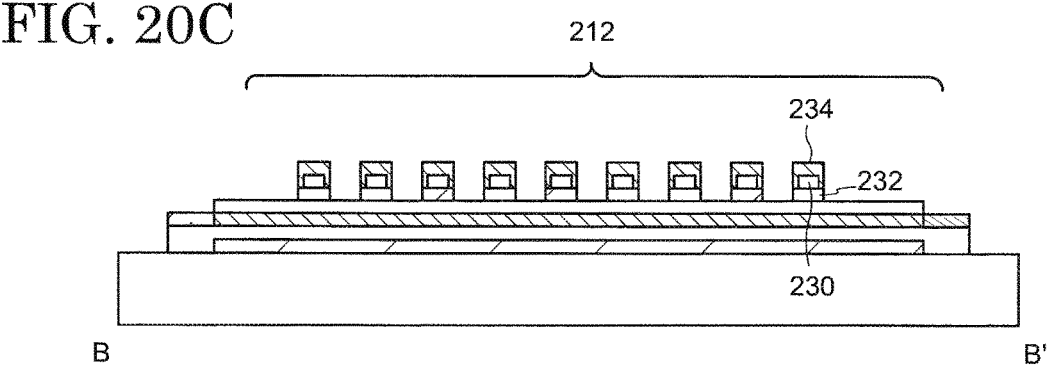
Figure 21A:
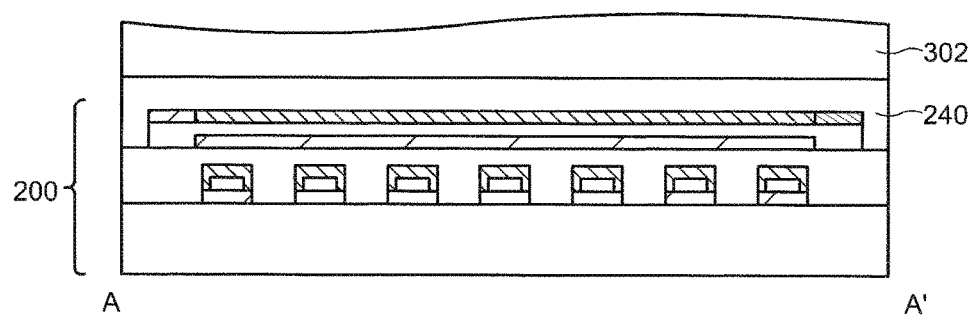
FIG. 21A and FIG. 21B are schematic cross-sectional views for explaining a manufacturing method of a display device according to an embodiment of the present invention.
Figure 21B:
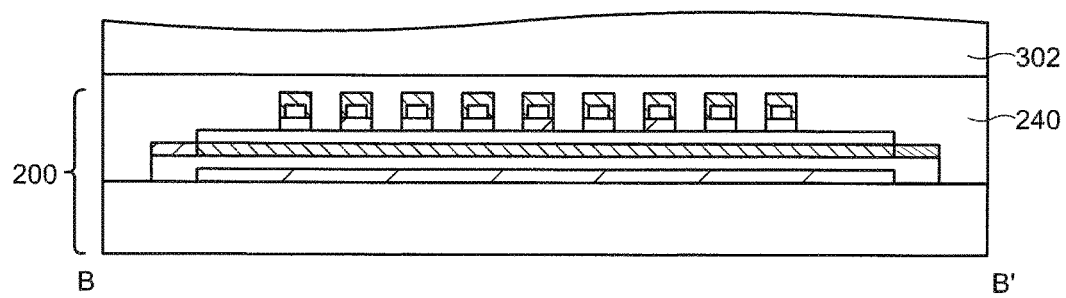

In the present embodiment, an example of a manufacturing method of the touch sensor 200 described in the First Embodiment is explained by using FIG. 14A to FIG. 21B. FIG. 14A, FIG. 15A, FIG. 16A, FIG. 17A, FIG. 18A, FIG. 19A, and FIG. 20A are top views of the touch sensor 200. FIG. 14B, FIG. 15B, FIG. 16B, FIG. 17B, FIG. 18B, FIG. 19B, and FIG. 20B are schematic cross-sectional views corresponding to the chain line A-A' of FIG. 2. FIG. 14C, FIG. 15C, FIG. 16C, FIG. 17C, FIG. 18C, FIG. 19C, and FIG. 20C are schematic cross-sectional views corresponding to the chain line B-B' of FIG. 2. FIG. 21A and FIG. 21B show the states where the display panel 300 is mounted over the touch sensor 200 shown in FIG. 20B and FIG. 20C, respectively. Explanation of the structures the same as those of the First Embodiment may be omitted.

Figure 14A:
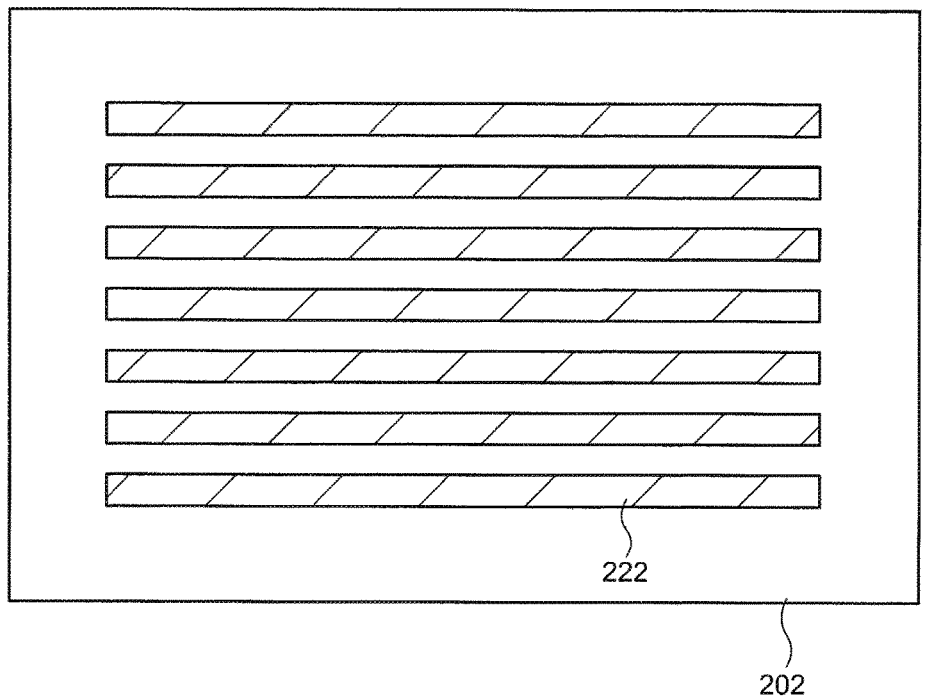
FIG. 14A is a schematic top view and FIG. 14B and FIG. 14C are schematic cross-sectional views for explaining a manufacturing method of a touch sensor according to an embodiment of the present invention.
Figure 14B:
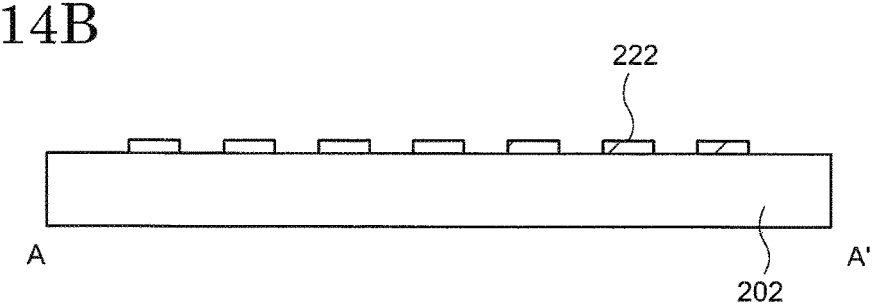
Figure 14C:
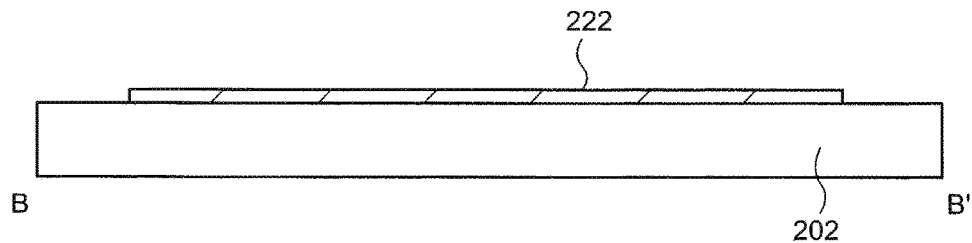

First, the first optical waveguides 210 are formed over the substrate 202. Specifically, the clads 222 are formed in a stripe form over the substrate 202 (FIG. 14A to FIG. 14C). The substrate 202 has a function to physically support the first optical waveguides 210 and the second optical waveguides 212 included in the detection region 204 and the display panel 300. Thus, a material having thermal resistance to the temperature in the formation process of the first optical waveguides 210 and the second optical waveguides 212 formed over the substrate 202, chemical stability to the chemicals used in the process, and physical strength to support the display panel 300 may be used, and the material may be a flexible material. Specifically, the substrate 202 may include glass, quartz, plastics, a metal, ceramics, and the like. A polymer material such as a polyimide, a polyamide, a polyester, and polycarbonate is represented as plastics.

The clads 222 may include a polymer material having a refractive index lower than that of the cores 220 formed thereover or a metal which reflects the light emitted from the light-emitting element 206. Specifically, the materials described in the First Embodiment may be selected. When a polymer material is used, the cores 220 can be formed by applying a wet-type film-forming method such as a spin-coating method, an ink-jet method, and a printing method. When a metal is employed, a sputtering method, a chemical vapor deposition method (CVD method), and the like may be applied.

Figure 15A:
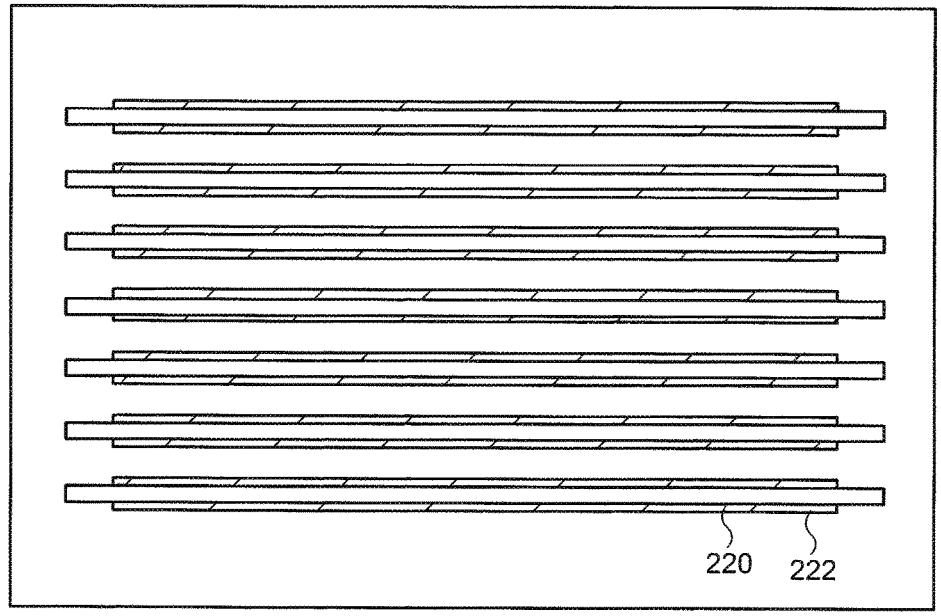
FIG. 15A is a schematic top view and FIG. 15B and FIG. 15C are schematic cross-sectional views for explaining a manufacturing method of a touch sensor according to an embodiment of the present invention.
Figure 15B:
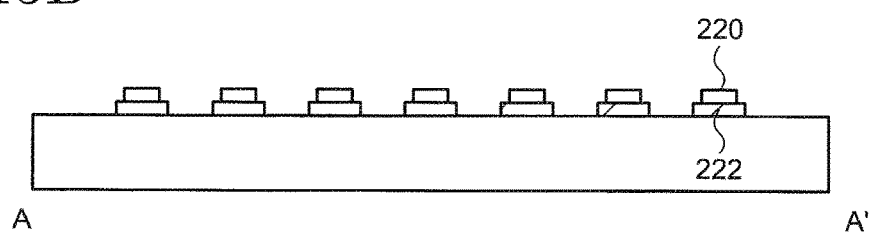
Figure 15C:
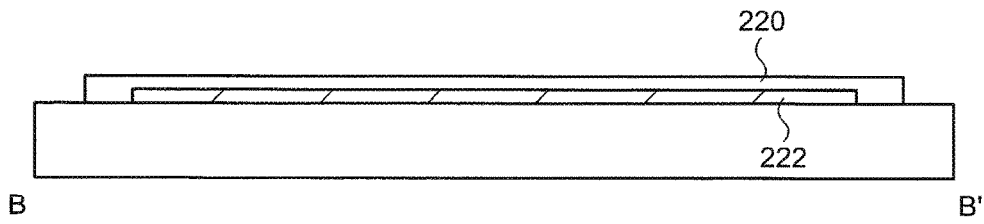

Next, the cores 220 are formed over the clads 220 so as to be in contact with the clads 222 (FIG. 15A to FIG. 15C). As described in the First Embodiment, a material exhibiting small absorption with respect to the light emitted from the light-emitting elements 206 and having rubber elasticity can be used for the cores 220. The cores 220 may be formed with the aforementioned wet-type film-forming method.

Figure 16A:
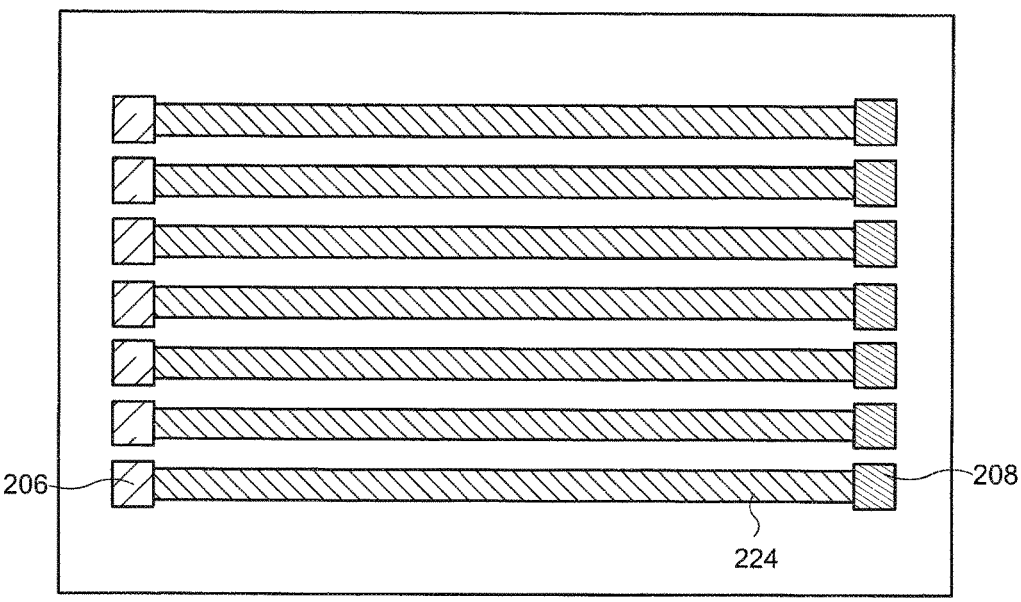
FIG. 16A is a schematic top view and FIG. 16B and FIG. 16C are schematic cross-sectional views for explaining a manufacturing method of a touch sensor according to an embodiment of the present invention.
Figure 16B:
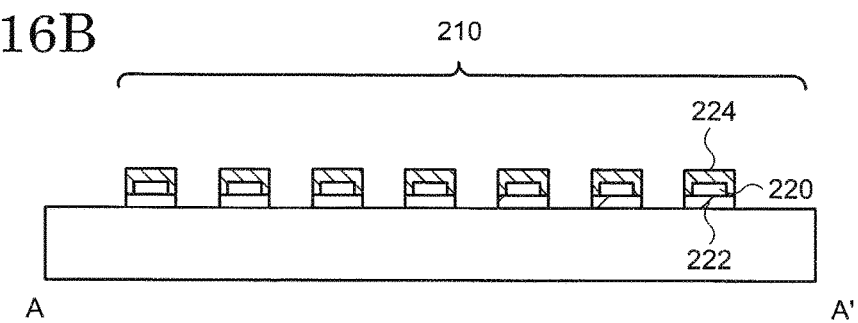
Figure 16C:
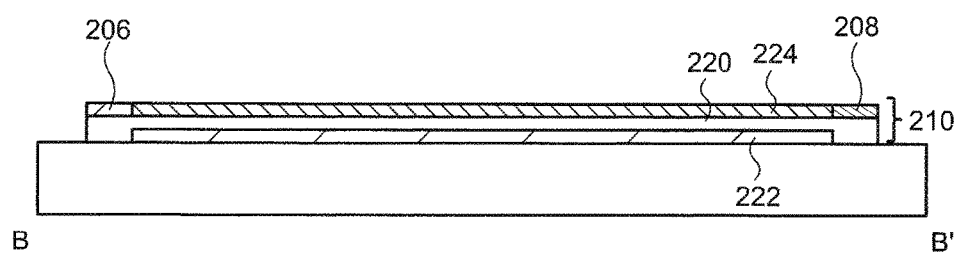

Next, the clads 224 are formed to surround the cores 220 with the clads 222 and 224 (FIG. 16A to FIG. 16C). That is, the clads 224 are formed so as to cover the top surfaces and the side surfaces of the cores 220 other than the edge surfaces thereof. Hence, other than both terminals, all of the bottom surfaces, the side surfaces, and the top surfaces of the cores 220 are covered by the clads 222 or 224. Note that, in the present embodiment, the cross-sectional shape of the cores 220 is rectangular. However, the shape is not limited thereto and may be polygonal, circular, or semicircular. As described below, the light-emitting elements 226 and the light-detecting elements 208 are each provided at one terminal and the other terminal of the cores 220, respectively, by which the light from the light-emitting elements 206 is introduced into the cores 220 and detected by the light-detecting elements 208. The clads 224 can be formed with the same method as that of the clads 222. Through the above process, the first optical waveguides 210 are fabricated.

Next, the light-emitting elements 206 and the light-detecting elements 208 are disposed (FIG. 16A and FIG. 16C). In the present embodiment, the light-emitting elements 206 and the light-detecting elements 208 are formed over the cores 220. Note that the light-emitting elements 206 and the light-detecting elements 208 may be formed prior to the formation of the clads 224.

Figure 17A:
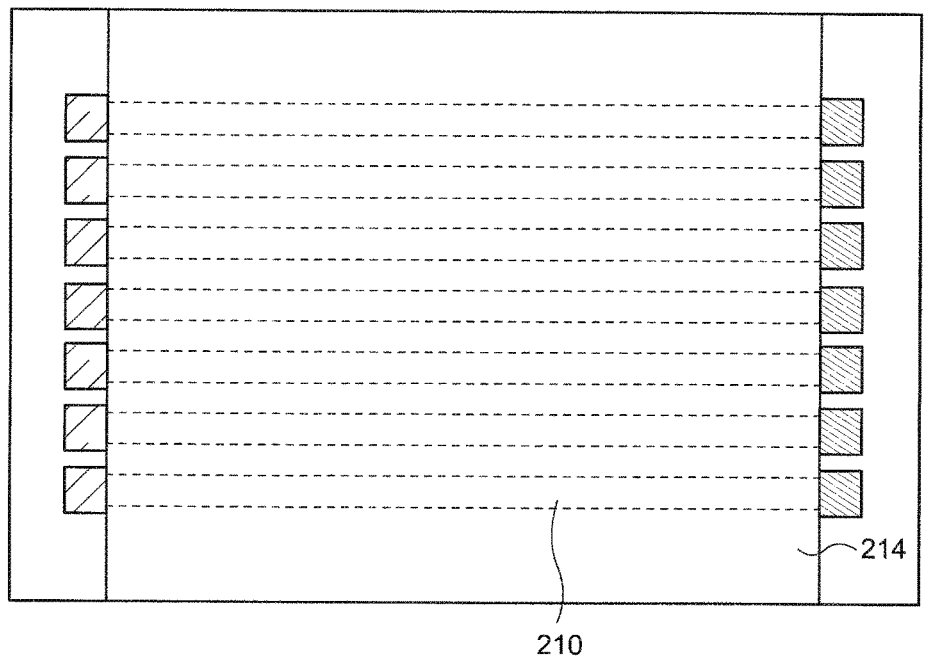
FIG. 17A is a schematic top view and FIG. 17B and FIG. 17C are schematic cross-sectional views for explaining a manufacturing method of a touch sensor according to an embodiment of the present invention.
Figure 17B:
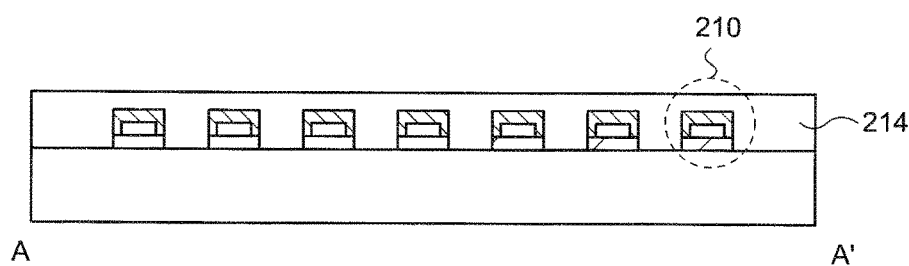
Figure 17C:
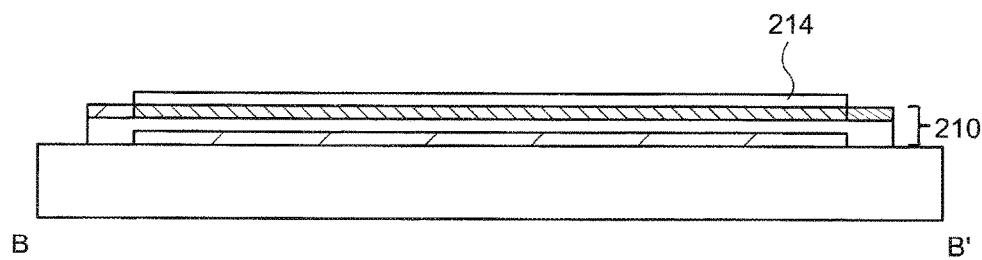

Next, the intermediate layer 214 is formed so as to cover the top surfaces and the side surfaces of the first optical waveguides 210 (FIG. 17A to FIG. 17C). As described in the First Embodiment, the intermediate layer 214 may include an inorganic compound such as silicon oxide, silicon nitride, silicon oxynitride, and silicon nitride oxide. In this case, the intermediate layer 214 can be formed with a CVD method by using silane gas, a trialkoxysilane, a tetraalkoxysilane, or the like as a raw-material gas, oxygen, ozone, or the like as an oxygen source, and ammonia, nitrogen oxide, or the like as a nitrogen source. Alternatively, the intermediate layer 214 may be formed by sputtering a target of an inorganic compound.

When the intermediate layer 214 is formed with a polymer material, the material described in the First Embodiment and having a modulus elasticity larger than that of the cores 220 may be selected. In this case, the intermediate layer 214 can be formed with a wet-type film-forming method. When the intermediate layer 214 is formed with a polymer material, a flat top surface can be obtained because depressions and projections caused by the first optical waveguides 210 are absorbed. Hence, flatness of the cores 230 of the second optical waveguides 212 formed over the intermediate layer 214 is improved, which enables detection of a touch of a user at higher accuracy.

Figure 18A:
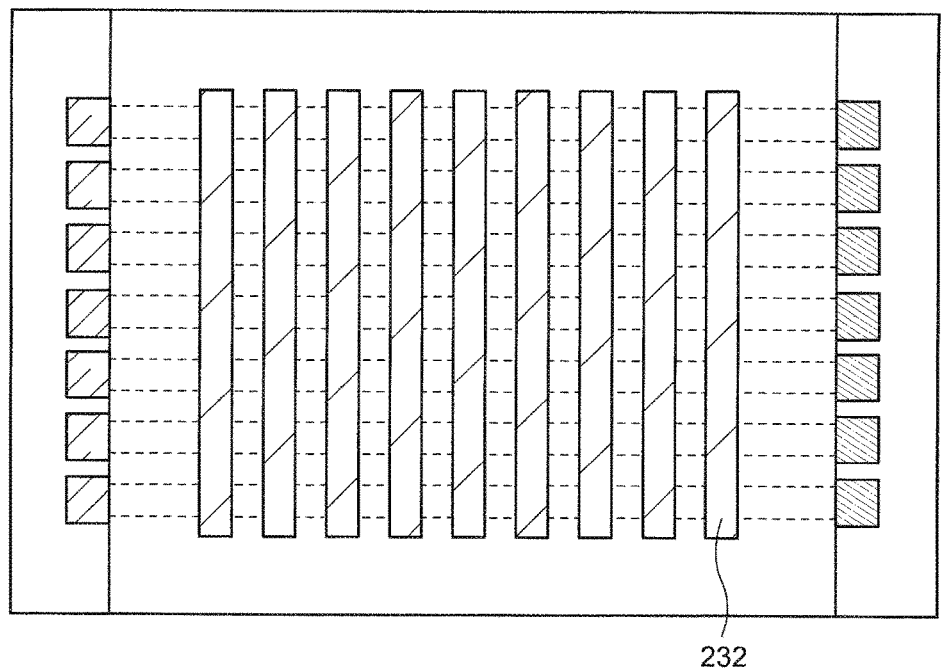
FIG. 18A is a schematic top view and FIG. 18B and FIG. 18C are schematic cross-sectional views for explaining a manufacturing method of a touch sensor according to an embodiment of the present invention.
Figure 18B:
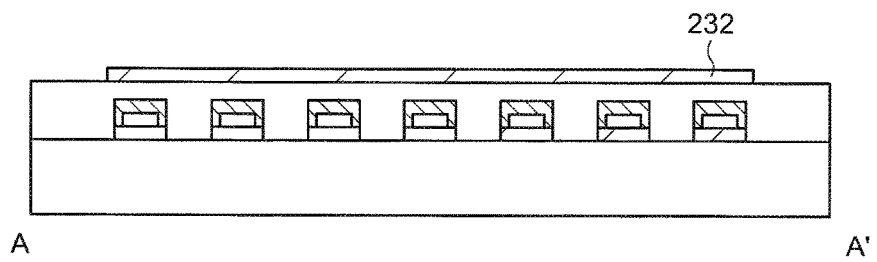
Figure 18C:
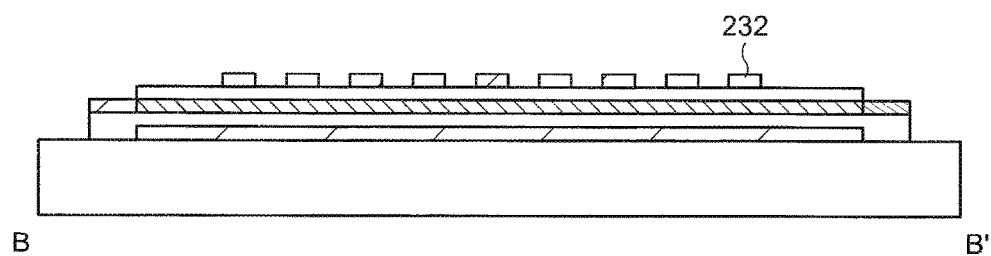

Next, the second optical waveguides 212 are formed over the intermediate layer 214. Specifically, the clads 232 are formed in a stripe form over the intermediate layer 214 (FIG. 18A to FIG. 18C). The clads 232 are formed so as to intersect the clads 222. The clads 232 can be formed with the same method and the same materials as those of the clads 222.

Next, the cores 230 are formed over the clads 232 so as to be in contact with the clads 232 (FIG. 19A to FIG. 19C). The cores 230 are also formed in a stripe form so as to intersect the cores 220. The cores 230 can be formed with the same method and the same material as those of the cores 220.

Next, similar to the formation of the first optical waveguides 210, the clads 234 are formed so as to surround the cores 230 by the clads 232 and 234 (FIG. 20A to FIG. 20C). That is, the clads 234 are formed to cover the top surfaces and the side surfaces of the cores 230 other than the edge surfaces thereof. Hence, other than both terminals, all of the bottom surfaces, the side surfaces, and the top surfaces of the cores 230 are covered by the clads 232 or 234. As described below, the light-emitting elements 206 and the light-detecting elements 208 are each disposed at one terminal and the other terminal of the cores 230, respectively, by which the light from the light-emitting elements 206 is introduced to the cores 230 and detected by the light-detecting elements 208. The clads 234 may be formed with the same method as that of the clads 232. Through the above process, the second optical waveguides 212 are fabricated.

After that, the light-emitting elements 206 and the light-detecting elements 208 are arranged at the terminals of the first optical waveguides 210 and the second optical waveguides 212, thereby fabricating the touch sensor 200 (FIG. 20A to FIG. 20C). Examples of the light-emitting elements 206 and the light-detecting elements 208 are described in the First Embodiment.

Although not shown, a protection film may be formed to cover the first optical waveguides 210, the second optical waveguides 212, the light-emitting elements 206, and the light-detecting elements 208. The protection film is provided to protect the first optical waveguides 210, the second optical waveguides 212, the light-emitting elements 206, and the light-detecting elements 208 and may include a silicon-containing inorganic compound such as silicon oxide and silicon nitride or a polymer material such as a polyimide, an acrylic resin, an epoxy resin, and a polyester.

Finally, the array substrate 302 of the display panel 300 is fixed over the touch sensor 200 via the adhesive layer 240, thereby giving the display device 100 (FIG. 21A and FIG. 21B).

Third Embodiment

In the present embodiment, an example of a manufacturing method of the display panel 300 described in the First Embodiment is explained by using FIG. 13, and FIG. 22A to FIG. 24B. FIG. 22A to FIG. 24B correspond to the schematic cross-sectional view of FIG. 13. Explanation of the structures the same as those of the First and Second Embodiments may be omitted.

Figure 22A:
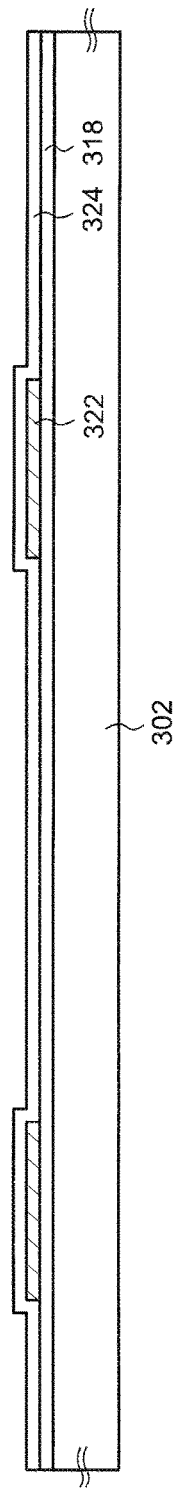
FIG. 22A to FIG. 22C are schematic cross-sectional views for explaining a manufacturing method of a display panel of a display device according to an embodiment of the present invention.

First, the undercoat 318 is formed over the array substrate 302 (FIG. 22A). The array substrate 302 has a function to support the semiconductor elements included in the display panel 300, such as the transistor 320 and the organic EL element 350. The array substrate 302 may include the same material as that of the substrate 202 and may be formed with a flexible material including a resin such as a polyimide.

The undercoat 318 is a film having a function to prevent diffusion of impurities such as an alkaline metal from the array substrate 302 to the transistor 320 and the like and may include an inorganic insulator such as silicon nitride, silicon oxide, silicon nitride oxide, and silicon oxynitride. The undercoat 318 may be formed with a CVD method, a sputtering method, or the like so as to have a single-layer structure or a stacked-layer structure. Note that, when an impurity concentration of the array substrate 302 is low, the undercoat 318 may not be formed or may be formed so as to partly cover the array substrate 302.

Next, the semiconductor film 322 is formed over the undercoat 318 (FIG. 22A). The semiconductor film 322 may include a Group 14 element such as silicon. Alternatively, the semiconductor film 322 may contain an oxide semiconductor. Group 13 elements such as indium and gallium may be used as an oxide semiconductor, and a mixed oxide of indium and gallium (IGO) is exemplified. When an oxide semiconductor is used, the semiconductor film 322 may further include a Group 12 element, and a mixed oxide including indium, gallium, and zinc (IGZO) is represented as an example. Crystallinity of the semiconductor film 322 is not limited and may be single-crystalline, polycrystalline, microcrystalline, or amorphous.

When the semiconductor film 322 includes silicon, the semiconductor film 322 may be formed with a CVD method by using silane gas and the like as a raw material. Crystallization may be performed on the obtained amorphous silicon by conducting a heat treatment or application of light such as a laser. When the semiconductor film 322 includes an oxide semiconductor, the semiconductor film 322 can be formed by utilizing a sputtering method and the like.

Next, the gate insulating film 324 is formed so as to cover the semiconductor film 322 (FIG. 22A). The gate insulating film 324 may have a single-layer structure or a stacked-layer structure and may be formed with the same method as that of the undercoat 318. Alternatively, an inorganic compound having high permittivity, such as hafnium oxide and hafnium silicate, may be used.

Figure 22B:
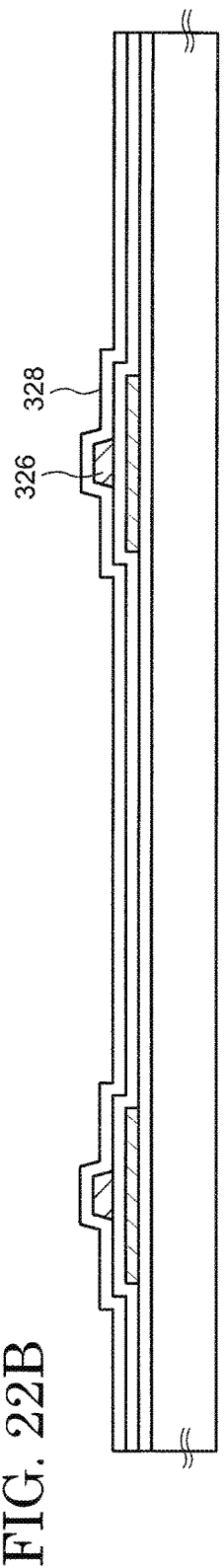

Next, the gate electrode 326 is formed over the gate insulating film 324 with a sputtering method, a CVD method, or the like (FIG. 22B). The gate electrode 326 can be formed with a metal such as titanium aluminum, copper, molybdenum, tungsten, and tantalum or an alloy thereof so as to have a single-layer or stacked-layer structure. For example, a structure may be employed in which a metal with high conductivity, such as aluminum or copper, is sandwiched by a metal with a relatively high melting point, such as titanium, tungsten, or molybdenum.

Next, the interlayer film 328 is formed over the gate electrode 326 (FIG. 22B). The interlayer film 328 may have a single-layer structure of a stacked-layer structure and can be formed with the same method as that of the undercoat 318.

Figure 22C:
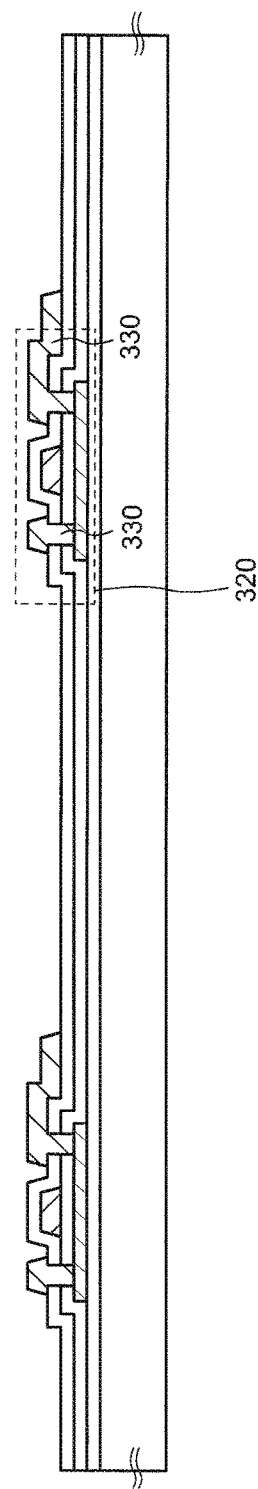

Next, etching is carried out on the interlayer film 328 and the gate insulating film 324 to form an opening portion reaching the semiconductor film 322. The opening portion can be formed by conducting plasma etching in a gas including a fluorine-containing hydrocarbon, for example. Next, a metal film is formed so as to cover the opening portion and processed with etching, resulting in the source/drain electrodes 330 (FIG. 22C). The metal film may have the same structure as that of the gate electrode 326 and can be formed with the same method as that of the gate electrode 326. Through the above process, the transistor 320 is fabricated.

Next, the leveling film 340 is formed so as to cover the source/drain electrodes 330 (FIG. 23A). As described above, the leveling film 340 has a function to absorb depressions, projections, and inclines caused by the transistor 320 or other semiconductor elements and give a flat surface. The leveling film 340 can be formed with an organic compound. A polymer material such as an epoxy resin, an acrylic resin, a polyimide, a polyamide, a polyester, a polycarbonate, and a polysiloxane is represented as an organic compound, and the leveling film 340 may be formed with a wet-type film-forming method. The leveling film 340 may have a stacked structure including a layer containing the aforementioned organic compound and a layer containing an inorganic compound. In this case, a silicon-containing inorganic compound such as silicon oxide, silicon nitride, silicon nitride oxide, and silicon oxynitride is represented as an inorganic compound, and a film containing these compounds may be formed with a sputtering method or a CVD method.

Next, etching is performed on the leveling film 340 to form the opening portion reaching one of the source/drain electrodes 330. After that, the first electrode 352 of the organic EL element 350 is formed over the leveling film 340 with a sputtering method or the like so as to cover the opening portion (FIG. 23B). In the present embodiment, a structure is shown where the first electrode 352 directly contacts with the source/drain electrode 330. However, another film having conductivity may be formed between the first electrode 352 and the source/drain electrode 330.

The first electrode 352 may include a conductive oxide with a light-transmitting property or a metal. In the present embodiment, since the light obtained from the organic EL element 350 is extracted in a direction opposite to the array substrate 302, a metal such as aluminum or silver or an alloy thereof may be used for the first electrode 352. In this case, it is possible to employ a stacked structure of the aforementioned metal or alloy and conductive oxide having a light-transmitting property, such as a stacked structure (conductive oxide/silver/conductive oxide) where a metal is sandwiched by a conductive oxide. As a conductive oxide, indium-tin oxide (ITO) or indium-zinc oxide (IZO) may be used.

Next, the partition wall 342 is formed so as to cover the edge portion of the first electrode 352 (FIG. 23B). Steps caused by the edge portion of the first electrode 352 and the like can be covered with the partition wall 342. The partition wall 342 is also an insulating film and may be formed with a wet-type film-forming method by using a material usable in the leveling film 340, such as an epoxy resin and an acrylic resin.

Figure 24A:
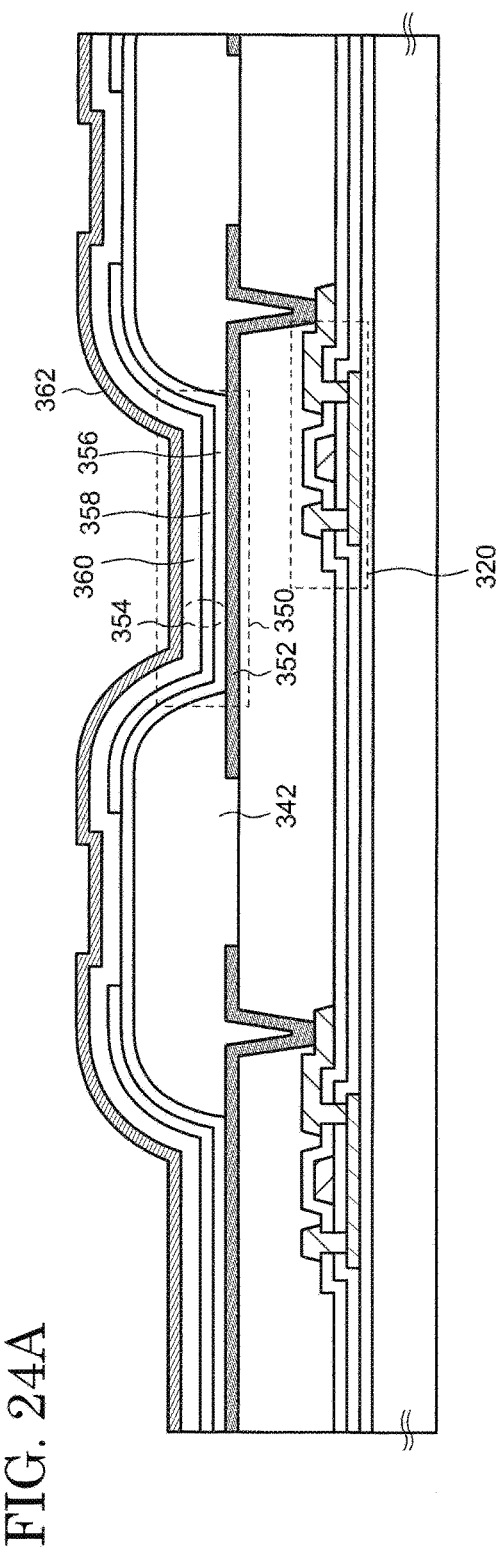
FIG. 24A and FIG. 24B are schematic cross-sectional views for explaining a manufacturing method of a display panel of a display device according to an embodiment of the present invention.

Next, the organic EL element 350 is formed. Specifically, the EL layer 354 is formed over the first electrode 352 and the partition wall 342 (FIG. 24A). The EL layer 354 shown in FIG. 24A has a three-layer structure including the first layer 356, the second layer 358, and the third layer 360. However, the structure of the EL layer 354 is not limited. The EL layer 354 may be formed with a single layer or four or more layers. For example, the EL layer 354 can be formed by appropriately combining a carrier-injection layer, a carrier-transporting layer, an emission layer, a carrier-blocking layer, an exciton-blocking layer, and the like. The EL layer can be formed with the aforementioned wet-type film-forming method, an evaporation method, or the like. The second layer 358 is individually formed between the pixels 310, and change of the material pixel-by-pixel allows the organic EL elements 350 to emit light with different colors.

In FIG. 24A, an example is demonstrated where the first layer 356 and the third layer 360 are continuously formed over the adjacent pixels 310, while the second layer 358 is separately formed between the adjacent pixels 310. However, the structure of the EL layer 354 is not limited thereto. For example, the EL layer 354 having the same structure may be continuously fabricated over all of the pixels 310. In this case, the EL layer 354 giving white emission is formed so as to be shared by the adjacent pixels 310 and the wavelength of the light extracted from each pixel 310 is selected by using a color filter and the like, for example. Alternatively, the structure of the EL layer 354 may be different between the adjacent pixels 310. For example, the EL layer 354 may be formed so that the emission layer is different but other layers have the same structure between the adjacent pixels 310. On the contrary, all of the layers in the EL layer 354 may be independently formed between the adjacent pixels 310.

Formation of the second electrode 362 over the EL layer 354 results in the organic EL element 350 (FIG. 24A). For example, a film of a metal or an alloy of magnesium, silver, or the like is formed at a thickness which allows visible light to pass therethrough, leading to the formation of the second electrode 362. Alternatively, the second electrode 362 may be formed with a sputtering method and the like by using a conductive oxide transmitting visible light, such as ITO and IZO. With this structure, the light emitted from the EL layer 354 can be extracted through the second electrode 362.

Figure 24B:
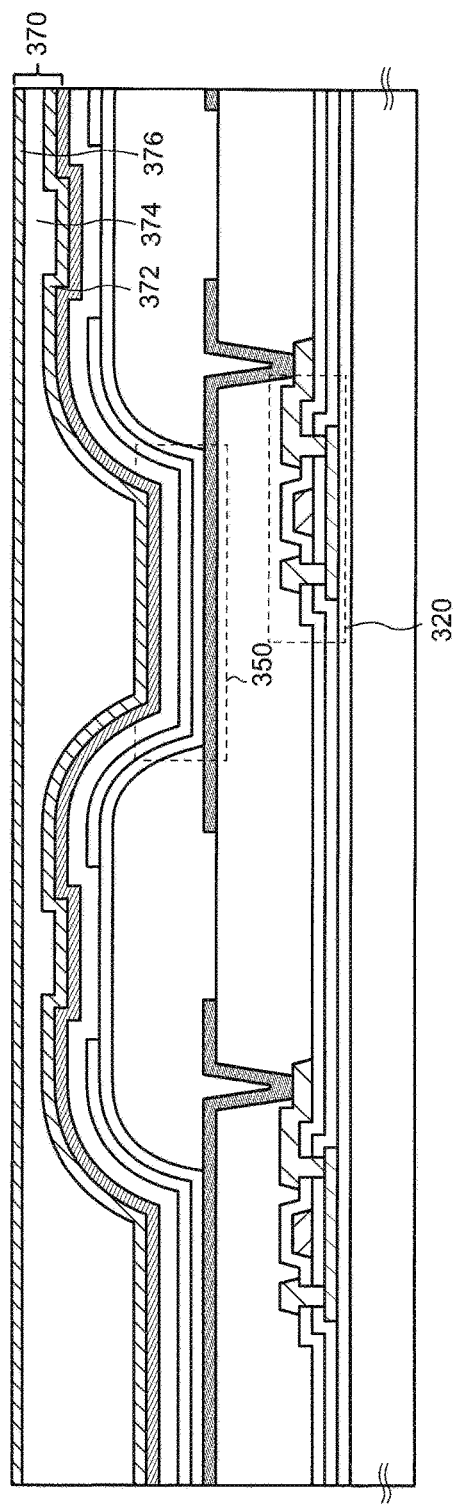

Next, the passivation film 370 is formed over the organic EL element 350 (FIG. 24B). As shown in FIG. 24B, the passivation film 370 may have a three-layer structure, for example. Such a structure can be formed as follows. First, the first layer 372 is formed over the second electrode 362. The first layer 372 may include an inorganic compound such as silicon nitride, silicon oxide, silicon nitride oxide, and silicon oxynitride and can be formed with the same method as that of the undercoat 318. Next, the second layer 374 is formed. The second layer 374 may contain an organic resin including an acrylic resin, a polysiloxane, a polyimide, a polyester, or the like. Moreover, as shown in FIG. 24B, the second layer 374 may be formed at a thickness so that depressions and projections cause by the partition wall 342 are absorbed and a flat surface is provided. The second layer 374 can be formed with the aforementioned wet-type film-forming method. Alternatively, the second layer 374 may be formed by atomizing or gasifying oligomers serving as a raw material of the aforementioned polymer material under a reduced pressure, spraying the first layer 372 with the oligomers, and then polymerizing the oligomers. After that, the third layer 376 is formed (FIG. 24B). The third layer 376 may have the same structure and may be prepared with the same method as those of the first layer 372.

The passivation film 370 with such a structure exhibits a high gas-barrier property, which prevents entrance of impurities such as water and oxygen to the organic EL layer 350, providing high reliability to the display panel 300.

After that, the opposing substrate 304 is fixed over the passivation film 370 by using the adhesive layer 380 (FIG. 13). An epoxy resin and the like can be used for the adhesive layer 380. Through the above process, the display panel 300 is fabricated.

After that, as described in the Second Embodiment, the display panel 300 is fixed over the touch sensor 200, by which the display device 100 is manufactured (FIG. 21A and FIG. 21B).

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

In the specification, although the cases of the organic EL display device are exemplified, the embodiments can be applied to any kind of display devices of the flat panel type such as other self-emission type display devices, liquid crystal display devices, and electronic paper type display device having electrophoretic elements and the like. In addition, it is apparent that the size of the display device is not limited, and the embodiment can be applied to display devices having any size from medium to large.

It is properly understood that another effect different from that provided by the modes of the aforementioned embodiments is achieved by the present invention if the effect is obvious from the description in the specification or readily conceived by persons ordinarily skilled in the art.

What is claimed is:

1. A touch sensor comprising:
    a plurality of first optical waveguides arranged in a stripe form;
    a plurality of second optical waveguides over the plurality of first optical waveguides, the plurality of second optical waveguides being arranged in a stripe form and intersecting the plurality of first optical waveguides; and
    an intermediate layer between the plurality of first optical waveguides and the plurality of second optical waveguides,
    wherein each of the plurality of first optical waveguides and the plurality of second optical waveguides comprises:
        a core including an elastomer; and
        a clad in contact with the core other than side surfaces of the core perpendicular to a longitudinal direction of the core, and
    the intermediate layer has a modulus of elasticity higher than that of the elastomer.

2. The touch sensor according to claim 1, wherein the intermediate layer includes an inorganic compound.

3. The touch sensor according to claim 1, wherein the intermediate layer includes an organic compound.

4. The touch sensor according to claim 1, wherein the clad includes a material having a refractive index lower than that of the core.

5. The touch sensor according to claim 1, wherein the clad includes a metal.

6. The touch sensor according to claim 1, wherein the elastomer includes a polysiloxane.

7. A touch sensor comprising:
    a plurality of first optical waveguides arranged in a stripe form; and
    a plurality of second optical waveguides over the plurality of first optical waveguides, the plurality of second optical waveguides being arranged in a stripe form and intersecting the plurality of first optical waveguides,
    wherein:
    each of the plurality of first optical waveguides and the plurality of second optical waveguides comprises:
        a core including an elastomer; and
        a clad in contact with the core other than side surfaces of the core perpendicular to a longitudinal direction of the core;
    the touch sensor has a first region and a second region;

the plurality of first optical waveguides and the plurality of second optical waveguides are located in the first region;

light-emitting elements and light-detecting elements are located in the second region; and side surfaces of the plurality of first optical waveguides and the plurality of second optical waveguides perpendicular to a longitudinal direction thereof are each in contact with the respective light-emitting element and the respective light-detecting element at an interface between the first region and the second region.

8. The touch sensor according to claim 7,
wherein the light-emitting elements emit infrared light or visible light.

9. A display device comprising:
a touch sensor; and
a display panel over the touch sensor, the display panel having a display region and a non-display region,
wherein:
the touch sensor comprises:
   a plurality of first optical waveguides arranged in a stripe form;
   a plurality of second optical waveguides over the plurality of first optical waveguides, the plurality of second optical waveguides being arranged in a stripe form and intersecting the plurality of first optical waveguides; and
   light-emitting elements and light-detecting elements in the non-display region;
each of the plurality of first optical waveguides and the plurality of second optical waveguides comprises:
   a core including an elastomer;
   a clad in contact with the core other than side surfaces of the core perpendicular to a longitudinal direction of the core in at least the display region; and
   a reflection surface at an interface between the core and the clad;
each of the plurality of first optical waveguides and the plurality of second optical waveguides is sandwiched by the respective light-emitting element and light-detecting element; and
the display panel comprises:
   a substrate; and
   a display element over the substrate.

10. The display device according to claim 9, further comprising an intermediate layer between the plurality of first optical waveguides and the plurality of second optical waveguides.

11. The display device according to claim 10,
wherein the intermediate layer includes an inorganic compound.

12. The display device according to claim 10,
wherein the elastomer includes a polysiloxane.

13. The display device according to claim 10,
wherein the intermediate layer has a modulus of elasticity higher than that of the elastomer.

14. The display device according to claim 9,
wherein the light-emitting elements emit infrared light or visible light.

15. The display device according to claim 9,
wherein the display element is an organic electroluminescence element.

16. The display device according to claim 9,
wherein the display panel is configured to display an image on the display panel, and
the touch sensor is arranged under the display panel.

17. The display device according to claim 9, further comprising an adhesion layer between the touch sensor and the display panel.

* * * * *